United States Patent [19]
Kohno et al.

[11] Patent Number: 5,830,271
[45] Date of Patent: Nov. 3, 1998

[54] SEEDS FEEDING TANK OF A GEL COATING APPARATUS

[75] Inventors: Yasushi Kohno; Yoichi Ido; Kazushi Nakatsukasa, all of Shizuoka, Japan

[73] Assignee: Yazaki Corporation, Tokyo, Japan

[21] Appl. No.: 757,600

[22] Filed: Nov. 29, 1996

[30] Foreign Application Priority Data

Nov. 29, 1995 [JP] Japan .................................. 7-310699

[51] Int. Cl.$^6$ ........................................................ B05C 3/00
[52] U.S. Cl. ................................ 118/13; 118/19; 118/417
[58] Field of Search ............................. 118/13, 19, 417; 366/105, 107, 191

[56] References Cited

U.S. PATENT DOCUMENTS

| | | |
|---|---|---|
| 4,806,357 | 2/1989 | Garrett et al. . |
| 5,080,925 | 1/1992 | Kouno . |
| 5,421,882 | 6/1995 | Kouno et al. . |
| 5,509,963 | 4/1996 | Kohno . |

FOREIGN PATENT DOCUMENTS 7-135804   5/1995   Japan .

*Primary Examiner*—Laura Edwards
*Attorney, Agent, or Firm*—Armstrong, Westerman, Hattori, McLeland & Naughton

[57] ABSTRACT

For feeding seeds contained in a tank main body of a seeds feeding section to a gel coating section by means of suction tips arranged in a seeds transfer section in order to coat them with a gellant, a total of eight through bores are formed along the upper end of the peripheral wall of the tank main body at positions corresponding to the suction tip and arranged at regular intervals so that an annular adaptor having a through bore running through the center thereof is fitted into each of the through bores. The inner peripheral wall of the through bore has a large diameter section located on the outer peripheral side of the peripheral wall for receiving a suction tip and a small diameter section smaller than the large diameter section located on the inner peripheral side of the peripheral wall for allowing seeds to pass therethrough from the tank main body. In a seeds feeding tank of a gel coating apparatus for coating seeds with a gellant and hardening the gellant to produce gel-coated seeds, seeds to be processed can be surely and securely sucked and held by suction tips before they are moved to a downstream processing step of coating seeds with a gellant regardless of the amount of seeds remaining in the seed hopper containing them.

19 Claims, 19 Drawing Sheets

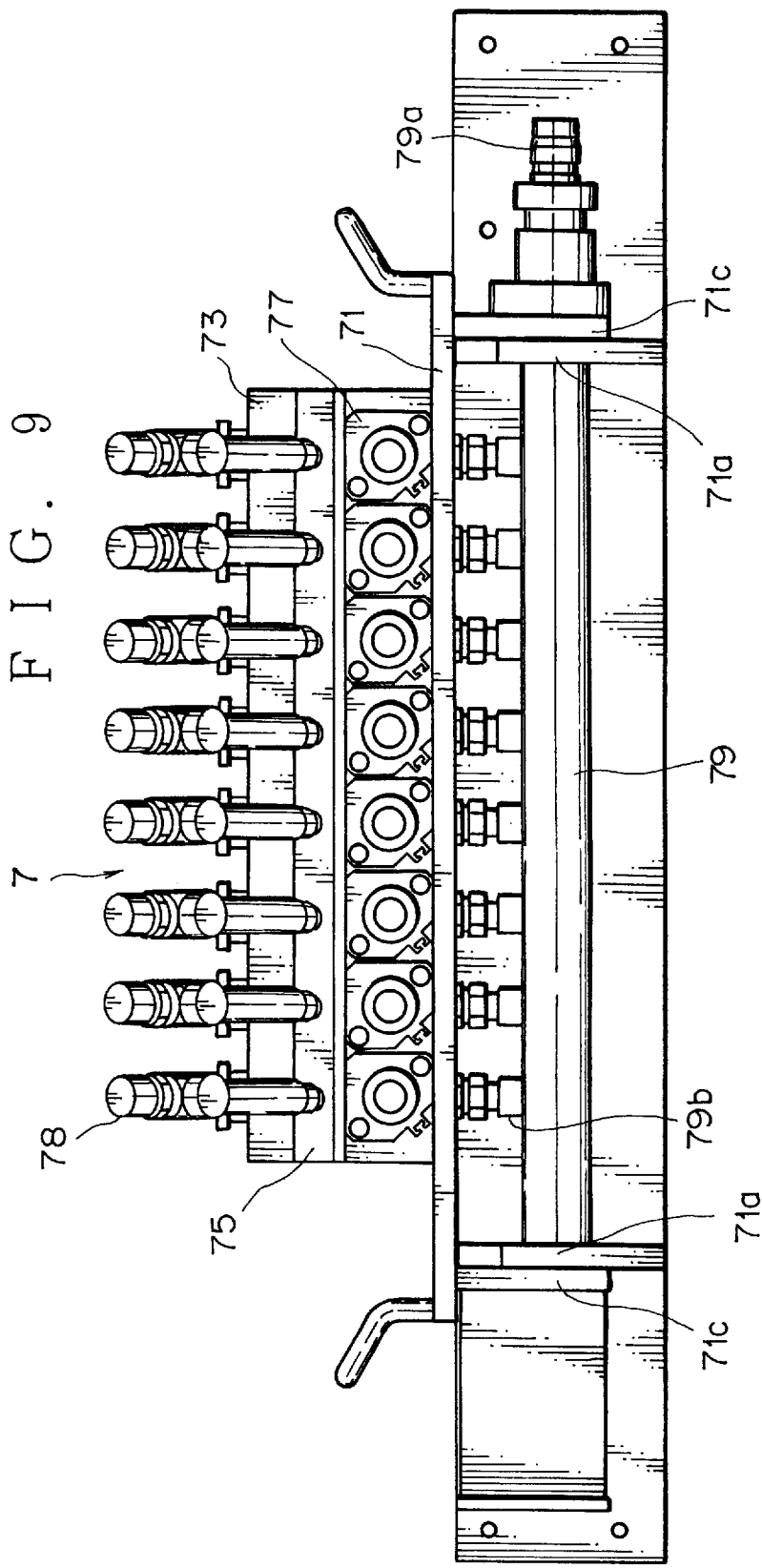

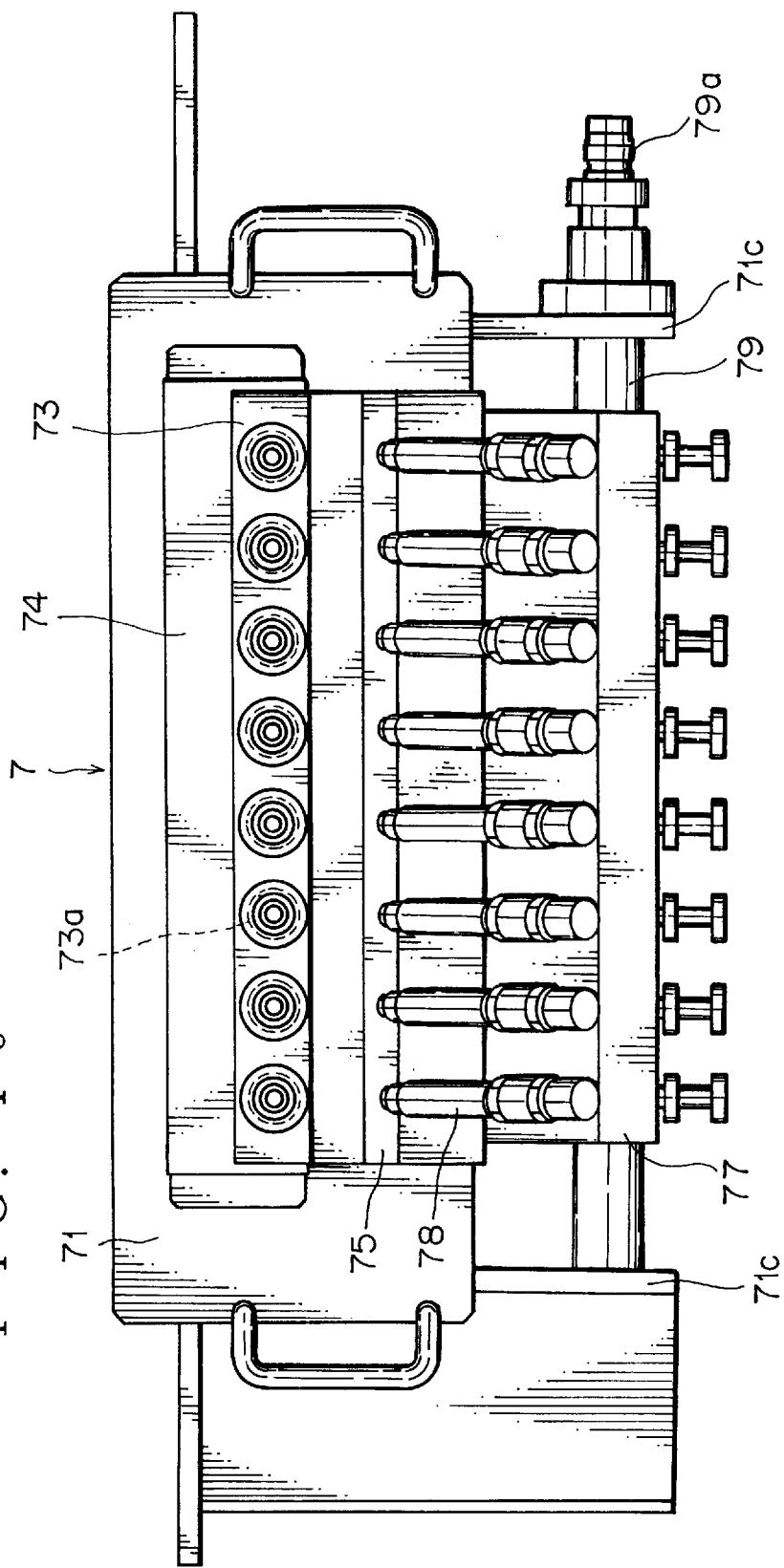

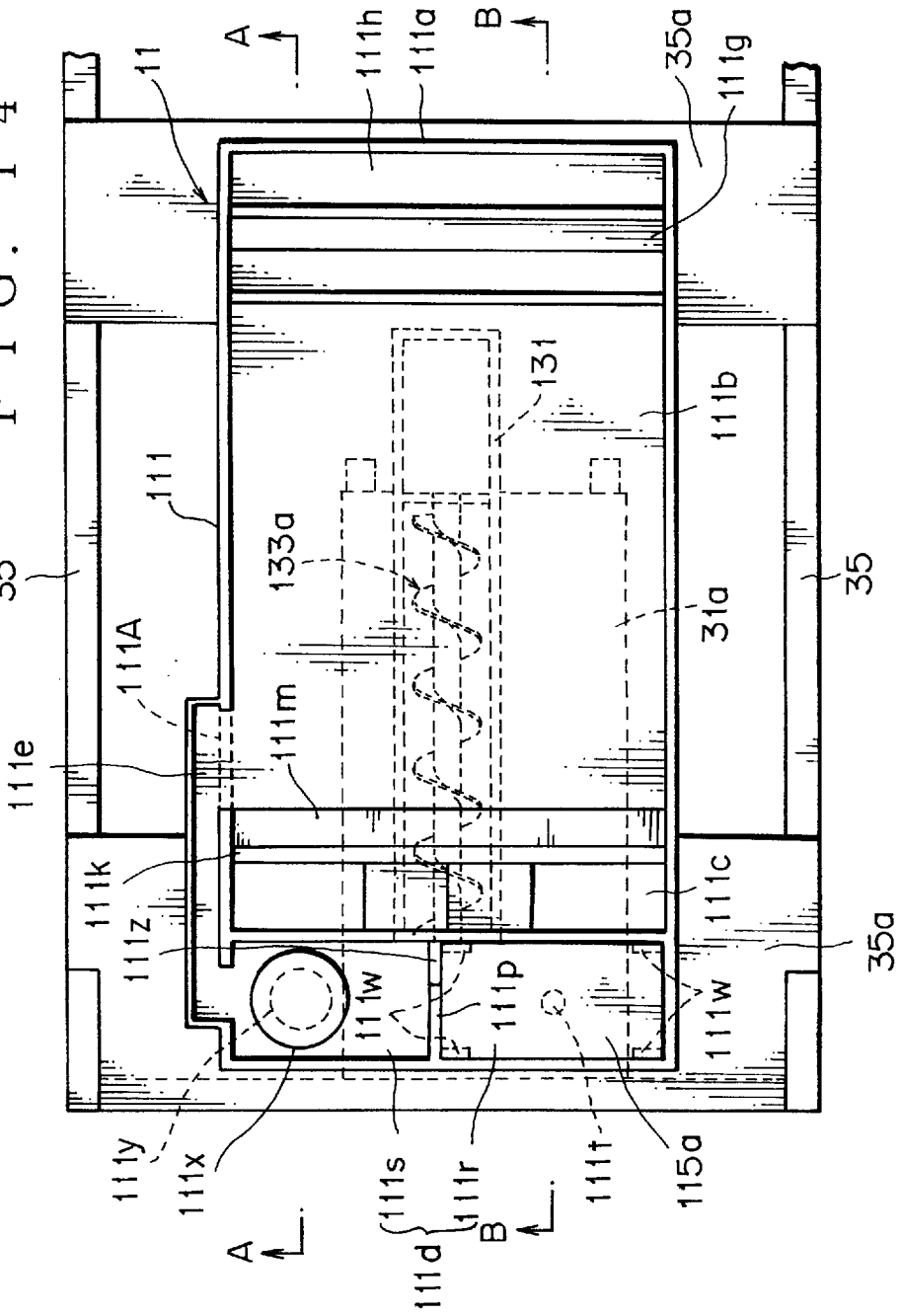

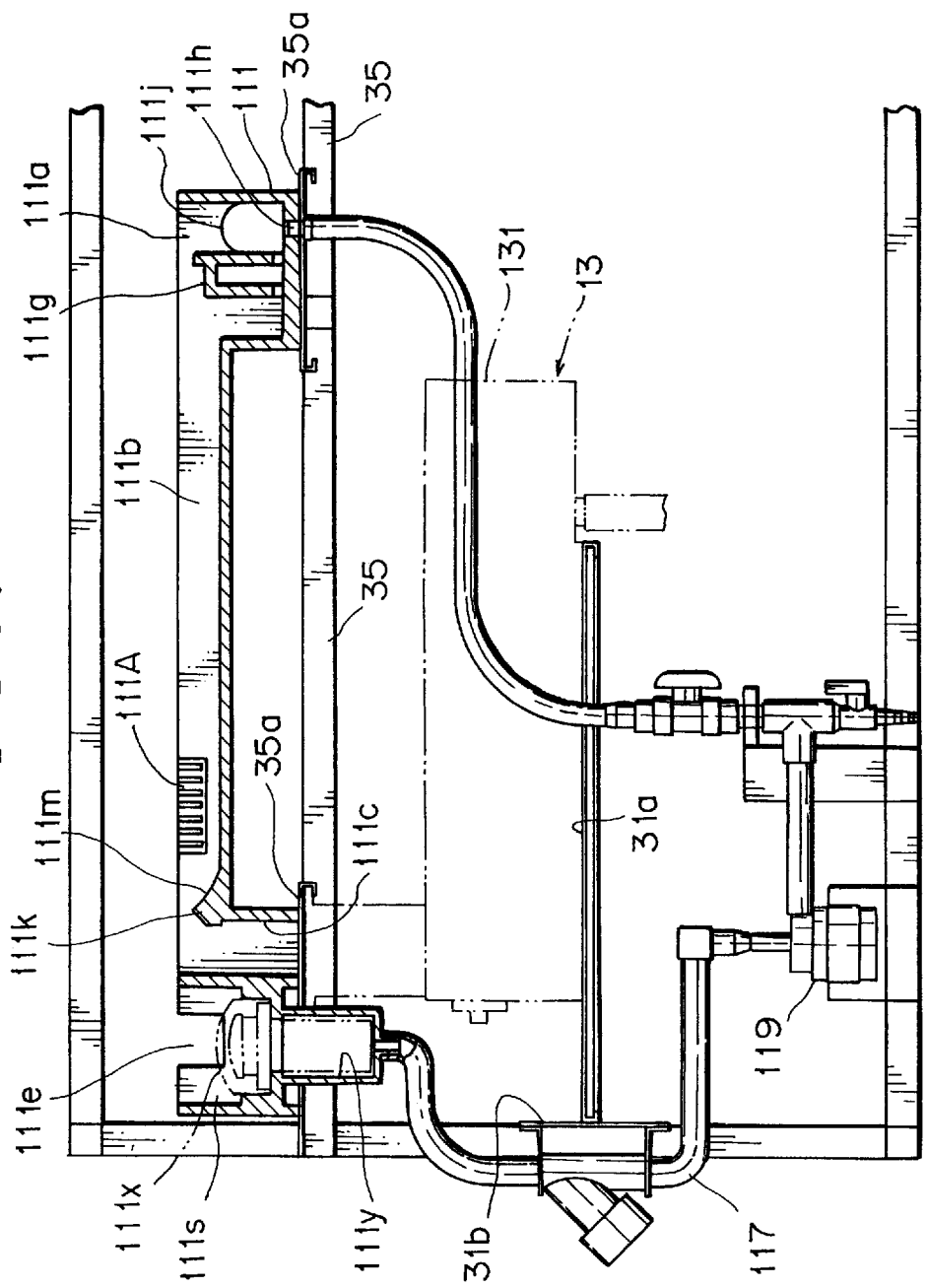

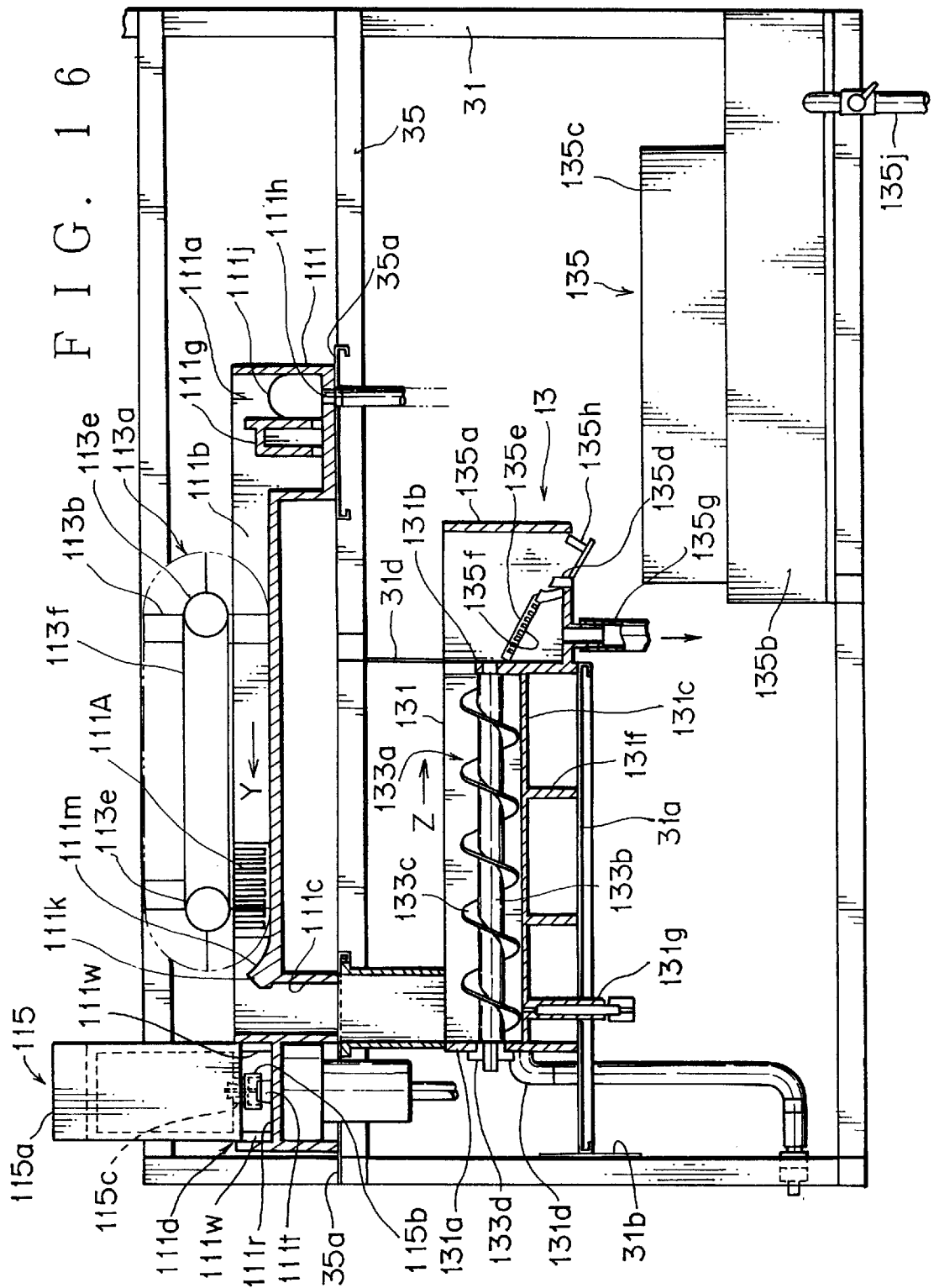

SEEDS FEEDING TANK OF A GEL COATING APPARATUS

BACKGROUND OF THE INVENTION

1. Field of the Invention

This invention relates to a seed feeding tank for a gel-coating apparatus, wherein the seed feeding tank contains seeds to be fed to and processed at a station for coating the seeds with a polymeric gel to produce gel-coated seeds.

2. Description of the Related Art

Gel-coated seeds, prepared by coating seeds with a resilient polymeric gel containing one or more nutrients and disinfectants, are known.

Gel-coating is a technique for effectively disinfecting seeds and protecting the seeds from damage, such as being gnawed by rodents. Gel-coating can also improve the efficiency of sowing the seeds, because the seeds are larger in size after being gel-coated and hence, are easier to handle. Additionally, gel-coated seeds can absorb nutrients from the gel to raise the rate of germination of the seeds. Thus, a gel-coating can provide seeds with a number of advantages.

The inventors of the present invention have noticed these advantages and have proposed variations of a gel-coating apparatus for automatically producing gel-coated seeds.

FIG. 22 shows a schematic front view of such a gel coating apparatus proposed by the inventors of the present invention. The gel-coating apparatus is generally denoted by reference symbol A in FIG. 22 and comprises a housing B, a seed hopper C, a seed transfer section D, a gellant tank E, a gel-processing section F, a hardening tank G, and a washing water tank J.

The seed hopper C is located slightly off the lateral centerline of the housing B and is vertically movably supported on the housing B by way of an air cylinder C1. The seed hopper C is open at the top end and has a substantially conical profile to show a circular plan view, as in FIG. 23, and a tapered lateral view, as in FIG. 22, with a small bottom end located around the vertical axis of the seed hopper C. The seed hopper C is designed to contain a large number of seeds therein so that the seeds may be coated with gel. The gellant tank E is located at a lower lateral position in the housing B and contains a highly viscous liquid gellant for gel-coating seeds therewith.

The gel-processing section F is located substantially at an upper central position in the housing B and is provided with a processing nozzle F1 having inner and outer pipes to form a double wall therein. Seeds are filled into the inner pipe of the processing nozzle F1 from the top end of the processing nozzle F1, whereas the gellant is filled into the outer pipe from a lateral side of the processing nozzle F1 by way of a tube (not shown). Thus, seeds are ejected one by one from the bottom end of the inner pipe of processing nozzle F1, while the gellant is injected from the bottom end of the outer pipe at a given rate by a plunger (not shown) so that each of the seeds ejected from the processing nozzle F1 is coated with the gellant and falls downwardly under its own weight.

The seed transfer section D includes a rotary actuator D1 arranged in the upper half of the housing B between the seed hopper C and the processing nozzle F1. The seed transfer section D also includes an oblong swirl arm D3, which is supported at a middle position thereof by the rotary actuator D1, and which is swingable in a horizontal plane. A pair of disposable suction tips D5 and D7 are removably fitted to the respective lower surfaces of the oppositely disposed ends of the swirl arm D3.

Each time the swirl arm D3 is rotated through 180° by means of the rotary actuator D1, the seed transfer section D alternately occupies first and second positions. At the first position, one of the pair of suction tips D5, D7 (say suction tip D5) is located above the seed hopper C, while the other of the pair of suction tips D5, D7 (in this case, suction tip D7) is located above the processing nozzle F1. At the second position, the pair of suction tips D5, D7 are located above the processing nozzle F1 and above the seed hopper C, respectively.

The hardening tank G is located at a middle level in the housing B and extends horizontally from below the processing nozzle F1 where gel-coated seeds drop one by one under their own weight to the opposite lateral end of the housing B. The hardening tank G contains a liquid hardening agent that flows within the tank G. The liquid hardening agent reacts with the gellant coating the fallen seeds to harden the gellant and thereby produce the gel-coated seeds.

As seen from FIG. 23, the hardening tank G contains a revolving screw feeder G1 therein. The revolving screw feeder G1 is for driving gel-coated seeds from below the processing nozzle F1 toward the opposite lateral end of the hardening tank G.

The washing water tank J is located behind the hardening tank G and extends horizontally along the hardening tank G. The washing water tank J contains flowing water therein. The flowing water is for washing the gel-coated seeds produced in the hardening tank G as the gellant is hardened there.

The washing water tank J also contains a revolving screw feeder J1 that rotates to drive gel-coated seeds in a direction opposite to the seed driving direction of the hardening tank G.

A known gel-coating apparatus A, having a configuration as described above, operates to coat seeds with gel in a manner as described below.

Assuming that the seed transfer section D is in the first position, the seed hopper C is moved upwardly by the air cylinder C1 and some of the seeds in the seed hopper C are sucked by the corresponding suction tip D5 that is held under negative pressure. Then, the seed hopper C is moved downwardly by the air cylinder C1 and the swirl arm D3 is horizontally rotated through 180° by means of the rotary actuator D1 to bring the seed transfer section D into the second position.

In the second position, the sucked seeds are thrown from above into the inner pipe of the processing nozzle F1, as the suction tip D5 is brought under positive pressure. Some of the seeds remaining in the seed hopper C that is moved upwardly by the air cylinder C1, are sucked by the corresponding suction tip D7 that is now held under negative pressure. Then, the above operational cycle is repeated to move seeds from the seed hopper C into the processing nozzle F1.

If the seeds in the seed hopper C are not easily sucked by the suction tips D5, D7 as the seed hopper is moved upwardly and downwardly by means of the air cylinder C1, the seed hopper C may be vertically vibrated at a high pitch to agitate the seeds in the seed hopper C so that the seeds may come close to the suction tips D5, D7.

Additionally, as seeds are thrown from above into the inner pipe of the processing nozzle F1, the plunger is operated to inject the gellant from the front end of the processing nozzle F1 in a concerted manner so that the seeds, which have been coated with the gellant, may fall under their own weight one by one from the front end of the processing nozzle F1 into the hardening tank G.

As the fallen gel-coated seeds in the hardening tank G are driven to move through the tank G by the screw feeder G1, the layer of gellant covering the seeds is hardened to produce gel-coated seeds so that as the gel-coated seeds that get to the other lateral end of the hardening tank G are then driven to ride over a partition G3 (see FIG. 23), separating the hardening tank G and the washing water tank J, into the washing water tank J by air blown out from air outlet ports (not shown) in synchronism with the rotary motion of the screw feeder G1.

Thereafter, as the gel-coated seeds moved into the washing water tank J are driven to move through the washing water tank J by the water flow given rise to by the screw feeder J1, the seeds are washed with water at the surface until the seeds get to the terminal end of the washing water tank J, where they are driven to ride over the partition J3 of the terminal end (see FIG. 23) into a gel-coated seed receiving delivery port K (see FIG. 23) by the screw feeder J1 and then into a product collector (not shown) arranged in a lower area of the gel-coating apparatus A.

The seeds remaining in the seed hopper C are constantly monitored so that additional seeds may be supplied whenever the amount of seeds in the hopper C falls under a predetermined level.

The known gel-coating apparatus A as described above has the drawback that seeds do not necessarily come close to the either one of the suction tips D5, D7 to get sucked therein. This is because the seeds are vertically vibrated at a high pitch as the seeds are sucked by the either one of the suction tips D5, D7 which is held under negative pressure and therefore, the seeds in the seed hopper C can vibrate in different directions to different extents depending on the quantity of seeds in the seed hopper C.

Such a known gel-coating apparatus A also has the drawback that the configuration of the component for driving the seed hopper C around the air cylinder C1 is complicated because the entire seed hopper C is vibrated vertically in order for the seeds to jump within the seed hopper C and thus, the seeds may flutter down from the seed hopper C because of vibration at a certain quantity of seeds within the seed hopper C.

Further, such a known gel-coating apparatus A also has a drawback that the operation of the gel-coating apparatus A has to be frequently interrupted in order to manually supply additional seeds if the quantity of seeds remaining in the seed hopper C is not constantly monitored in order to supply additional seeds whenever necessary.

SUMMARY OF THE INVENTION

In view of the above identified drawbacks and other problems of known gel-coating apparatus, it is therefore a first object of the present invention to provide a seed feeding tank of a gel-coating apparatus for coating seeds with a gellant and hardening the gellant to produce gel-coated seeds, wherein seeds to be processed can be surely and securely sucked and held by suction tips before the seeds are moved to a downstream processing step of coating seeds with a gellant regardless of the quantity of seeds remaining in the seed hopper in which the seeds are contained.

A second object of the present invention is to provide a seed feeding tank of a gel-coating apparatus, wherein seeds to be processed can be surely and securely agitated without being driven out of the seed hopper in which the seeds are contained.

A third object of the present invention is to provide a seed feeding tank of a gel-coating apparatus that can automatically supply additional seeds to the seed hopper as seeds are supplied for the processing step of coating seeds with a gellant and the quantity of seeds remaining in the hopper is reduced.

According to a first aspect of the present invention, the above first object is achieved by providing a seed feeding tank of a gel-coating apparatus which includes a tank main body for containing a large quantity of seeds to be coated with polymeric gel and a seed discharge port for keeping the inside of the tank main body in communication with the outside. The seed discharge port is disposed vis-a-vis a suction tip located outside the tank main body for sucking a seed from the tank main body, holding the seed and moving the seed to the outside of the tank main body. The seeds in the tank main body are agitated by an air jet flow, wherein the seed discharge port has a large diameter section arranged at the seed discharge port on the outside of the tank main body with an inner diameter corresponding to the outer profile of the suction tip to receive the suction tip located vis-a-vis the seed discharge port in the outside of the tank main body and a small diameter section arranged at the seed discharge port on the inside of the tank main body with an inner diameter smaller than the inner diameter of the larger diameter section, but large enough to allow a seed to pass therethrough. The large diameter section and the small diameter section are held in communication with each other.

A seed feeding tank of a gel-coating apparatus as described above may be so designed that a tank main body has through bores. Each through bore has an inner diameter greater than the inner diameter of the seed discharge port. The seed discharge port is arranged at an inner peripheral section of an annular adaptor removably fitted to each of the through bores.

A seed feeding tank of a gel-coating apparatus as described above may additionally be provided with a plurality of suction tips having different profiles and preferably a profile designed to correspond to the profile of each of the seeds to be processed is selected for use.

A seed feeding tank of a gel-coating apparatus as described above may additionally be provided with a plurality of adapters having respective seed discharge ports with different inner diameters corresponding to the respective profiles of the plurality of suction tips. An adapter having an inner diameter corresponding to the profile of each of the seeds to be processed is selected for use.

A seed feeding tank of a gel-coating apparatus as described above may further include an air chamber arranged at a lower area in the inside of the tank main body. The air chamber is designed to inject an air jet flow of compressed air fed from the outside to the inside of the tank main body to agitate the seeds to be processed. The rate of agitation by the air jet flow of the seeds to be processed in the tank main body is defined by the gap between the air chamber and the lower end of the inside of the tank main body.

According to a second aspect of the invention, the above second object is achieved by providing a seed feeding tank of a gel-coating apparatus including: a tank main body for containing a large number of seeds to be coated with polymeric gel, the seeds in the tank main body being agitated in the tank main body by an air jet flow; and an air chamber arranged at a lower area in the inside of the tank main body and designed to inject an air jet flow of compressed air fed from the outside to the inside of the tank main body to agitate the seeds to be processed, the rate of agitation by the air jet flow of the seeds to be processed in the tank main body being defined by the gap between the air chamber and the lower end of the inside of the tank main body.

A seed feeding tank of a gel-coating apparatus as described above may be so designed that a tank main body thereof has an arcuate inner peripheral surface to form an arcuate agitating air jet flow along the inner peripheral surface from the compressed air injected from the air chamber.

A seed feeding tank of a gel-coating apparatus as described above may additionally be so designed that the air chamber is vertically movably supported by the tank main body.

According to a third aspect of the invention, the above third object is achieved by providing a seed feeding tank of a gel-coating apparatus as described above and additionally so designed that the tank main body is provided with a hopper section receiving seeds to be contained in the tank main body for processing and a slit for keeping the inside of the hopper in communication with the inside of the tank main body. The rate of supplying seeds to be processed from the inside of the hopper to the inside of the tank main body is defined by the dimensions of the slit.

In accordance with a seed feeding tank of a gel-coating apparatus according to the invention, the inside and the outside of the tank main body is held in communication with each other by a small air through path that is produced at the seed discharge port arranged around the suction tip as the front end of the suction tip is inserted until it comes close to the boundary of the large diameter section and the small diameter section of the seed discharge port so that the air jet flow for agitating the seeds contained in the tank main body for processing partly leaks out of the tank main body by way of the air flow path.

Thus, the seeds in the inside of the tank main body can easily come close to the seed discharge port as they are driven by the air jet flow partly leaking out of the tank main body so that all the agitated seeds in the tank main body can be surely and securely sucked by the suction tip regardless of the amount of the seeds contained in the tank main body.

If a seed feeding tank of a gel-coating apparatus as described above is so designed that a tank main body thereof has through bores, each having an inner diameter greater than the inner diameter of the seed discharge port, which seed discharge port is arranged at an inner peripheral section of an annular adaptor removably fitted to each of the through bores, a cumbersome operation of forming a seed discharge port with a complex profile of having a large diameter section and a small diameter section directly in the tank main body can be avoided.

The seed feeding tank of a gel-coating apparatus as described above may additionally be provided with a plurality of suction tips having different profiles so that one of the profiles corresponding to the profile of each of the seeds to be processed may be selected for use. Also, a plurality of adapters having respective seed discharge ports with different inner diameters corresponding to the respective profiles of the plurality of suction tips are provided so that one of the adapters having an inner diameter corresponding to the profile of each of the seeds to be processed may be selected for use. The inner diameter of the seed discharge port can easily be adapted to the profile of the suction tip in position simply by selecting one of the prefabricated adapters that best fits the suction tip each time the latter is replaced.

If a seed feeding tank of a gel-coating apparatus according to the invention further comprises an air chamber, arranged at a lower area in the inside of the tank main body and designed to inject an air jet flow of compressed air fed from the outside to the inside of the tank main body to agitate the seeds to be processed, the rate of agitation by the air jet flow of the seeds to be processed in the tank main body is defined by the gap between the air chamber and the lower end of the inside of the tank main body. Furthermore, the rate of agitation by an air jet flow of the seeds contained in the tank main body for processing is held to a substantially constant level regardless of the amount of the seeds contained in the tank main body.

If a seed feeding tank of a gel-coating apparatus as described above is so designed that a tank main body thereof has an arcuate inner peripheral surface to form an arcuate agitating air jet flow along the inner peripheral surface from the compressed air injected from the air chamber, the seeds contained in the tank main body are agitated by an air jet flow in a substantially constant direction regardless of the quantity of the seeds contained in the tank main body.

If a seed feeding tank of a gel-coating apparatus as described above is additionally so designed that the air chamber is vertically movably supported by the tank main body, the rate of agitation by an air jet flow of the seeds contained in the tank main body can be regulated by regulating the gap between the vertically movable air chamber and the lower end of the inside of the tank main body.

Finally, if a seed feeding tank of a gel-coating apparatus is as described above and additionally is so designed that the tank main body is provided with a hopper section receiving seeds to be contained in the tank main body for processing and a slit for keeping the inside of the hopper in communication with the inside of the tank main body, the rate of supplying seeds to be processed from the inside of the hopper to the inside of the tank main body is defined by the dimensions of the slit, and seeds are automatically supplied to the inside of the tank main body whenever the quantity of seeds in the tank main body falls under a predetermined level as the seeds are gradually moved to the downstream step of coating them with a gellant.

The above objects and further objects and features of the present invention will be more apparent from the following description taken in conjunction with the accompanying drawings.

BRIEF DESCRIPTION OF THE DRAWINGS

FIG. 9 is an enlarged schematic front view of the gel-coating section of the apparatus of FIG. 2.

FIG. 10 is an enlarged schematic plan view of the gel-coating section of the apparatus of FIG. 2.

FIG. 14 is an enlarged schematic plan view of the gel-hardening section of the apparatus of FIG. 1.

FIG. 15 is a schematic cross-sectional view taken along line A—A of FIG. 14.

FIG. 16 is a schematic cross-sectional view taken along line B—B of FIG. 14.

DETAILED DESCRIPTION OF THE INVENTION

Now, the present invention will be described in greater detail by referring to the accompanying drawings that illustrate a preferred embodiment of seed feeding tank of a gel-coating apparatus according to the present invention.

Figure 1:
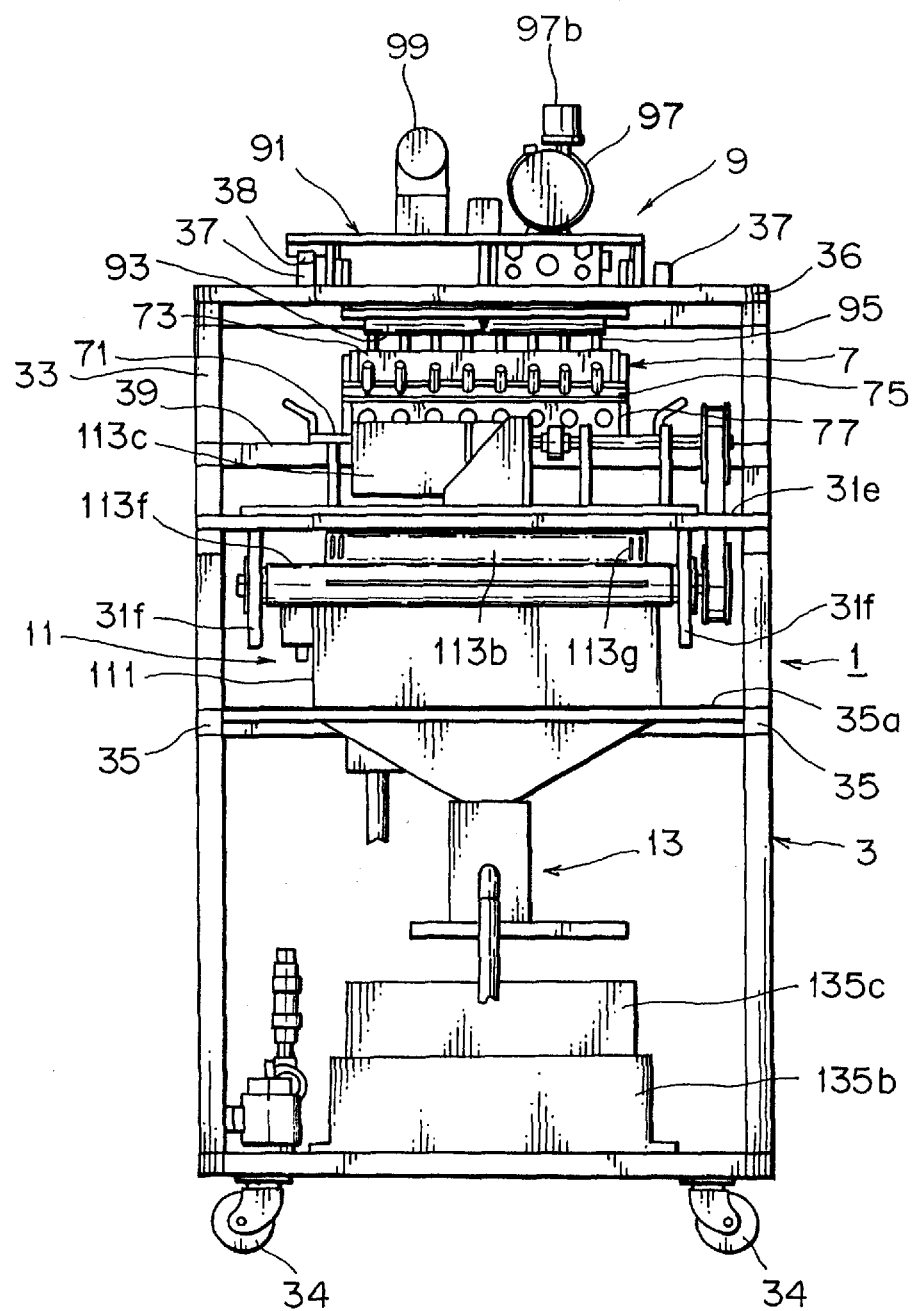
FIG. 1 is a schematic front view of a gel-coating apparatus employing a preferred embodiment of seed feeding tank according to the invention.
Figure 2:
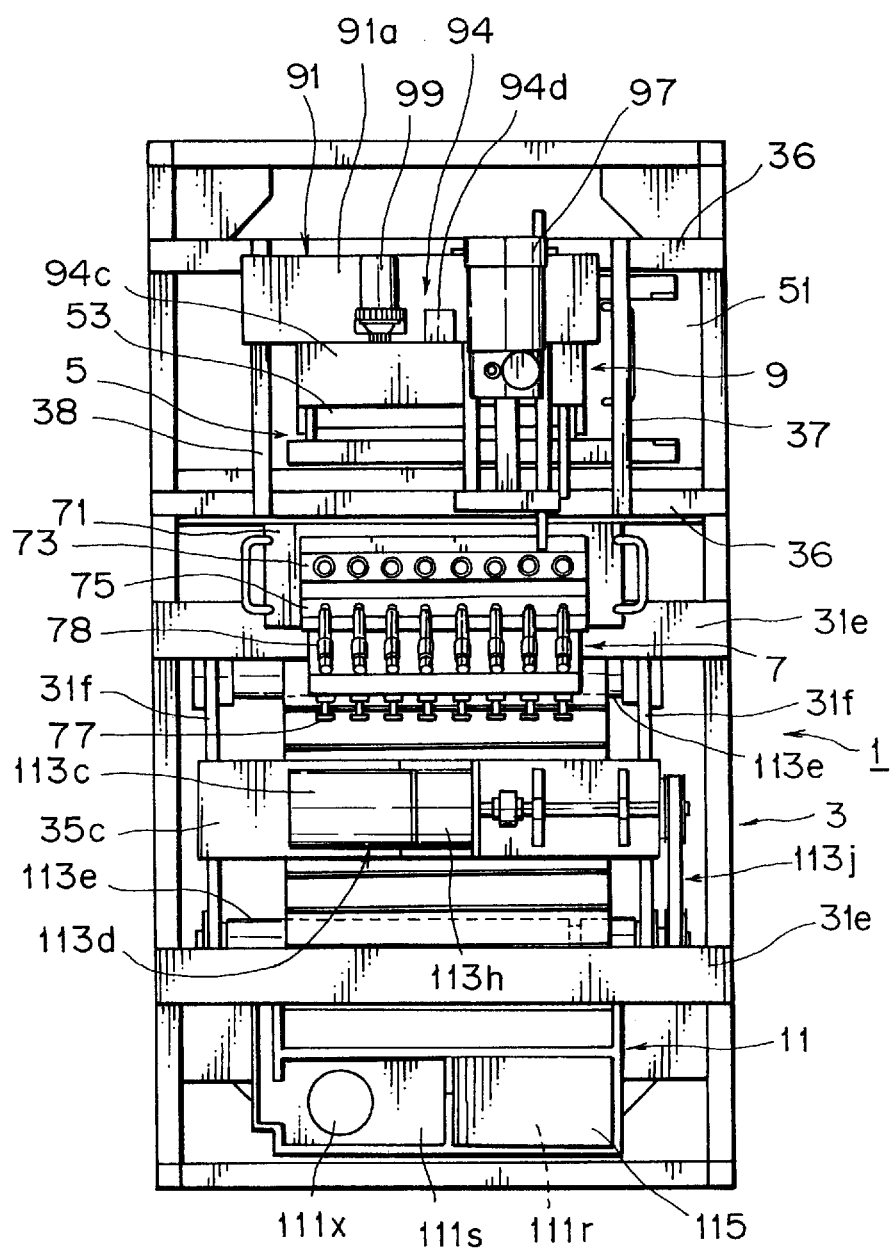
FIG. 2 is a schematic plan view of the gel-coating apparatus of FIG. 1.
Figure 3:
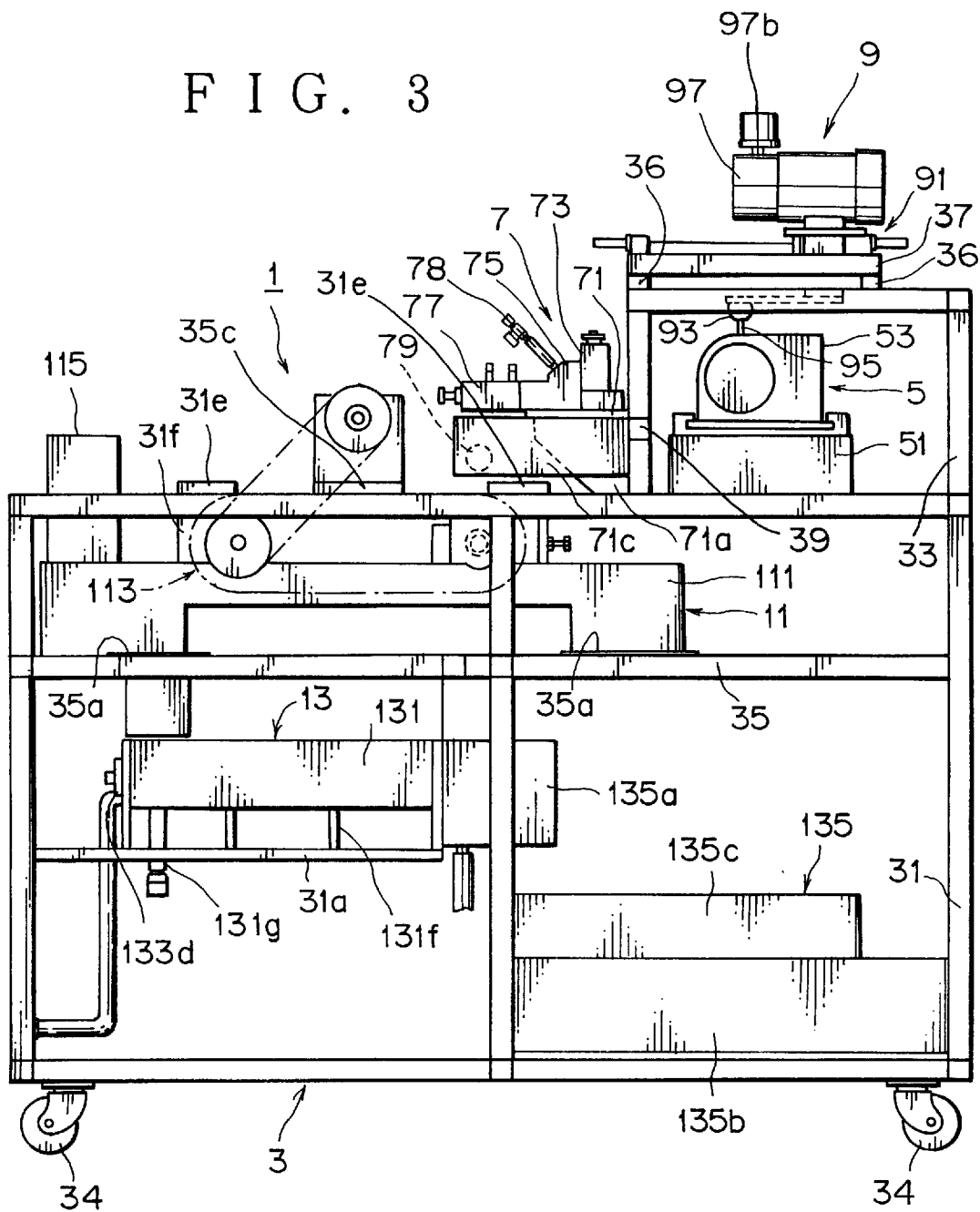
FIG. 3 is a schematic side view of the gel-coating apparatus of FIG. 1.

FIG. 1 is a schematic front view of a gel-coating apparatus employing a preferred embodiment of seed feeding tank according to the invention. FIGS. 2 and 3 schematically illustrate a plan view and a side view, respectively, of the gel-coating apparatus of FIG. 1, which is generally denoted by reference numeral 1. The gel-coating apparatus 1 includes a housing 3, a seed feeding section 5, a gel-coating section 7, a seed transfer section 9, a gel-hardening section 11, and a gel-washing section 13, as well as other components.

As seen from FIG. 3, the housing 3 includes a laterally open main frame 31 having a substantially rectangular plan view that is longitudinally oblong and an auxiliary frame 33 arranged close to the rear end of the main frame 31. The main frame 31 is movably supported by four casters 34 arranged at its four bottom corners. A horizontal reinforcing frame 35 is arranged slightly above the middle of the height of the main frame 31.

Figure 4:
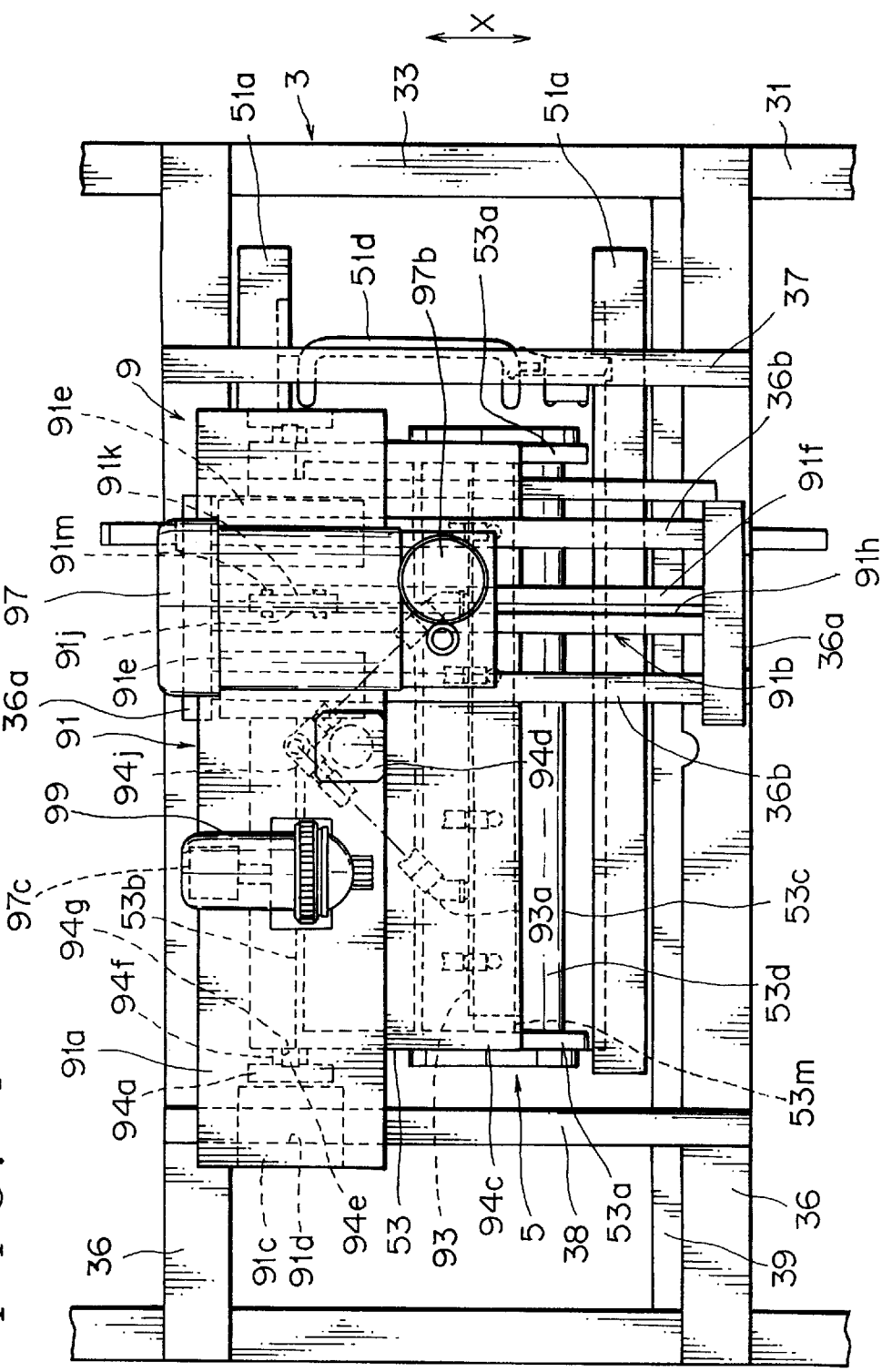
FIG. 4 is an enlarged schematic plan view of the auxiliary frame and the seed transfer section of the apparatus of FIG. 1.

As shown in FIG. 4 illustrating an enlarged plan view of the auxiliary frame 33 and the seed feeding section 5, a pair of upper main beams 36 are horizontally arranged at the front end. The pair of upper main beams 36 are arranged on a line located slightly in front of the rear end of the auxiliary frame 33.

A pair of upper auxiliary lateral beams 37 extend longitudinally between the paired main beams 36 and are separated by a given distance along the auxiliary frame 33. A guide rail 38 also extends longitudinally in parallel with the auxiliary beams 37 (see FIG. 5).

As seen from FIG. 1, a front transverse beam 39 extends horizontally between the lateral front frame members of the auxiliary frame 33 at a level slightly above the middle of the height of the auxiliary frame 33.

Additionally, as shown in FIG. 4, a pair of support panels 36a stand near the middle point of the upper main beams 36. The pair of support panels 36a are slightly close to the upper auxiliary beam 37 shown at the left side of FIG. 4 and a pair of guide shafts 36b extend horizontally in parallel with each other between the support panels 36a.

The seed feeding section 5 contains raw seeds to be coated with gel and is disposed on the main frame 31 in the inside of the auxiliary frame 33 as shown in FIG. 3. It includes a base member 51 rigidly secured onto the main frame 31 and a seed tank (operating as a seed feeding tank) rigidly secured to the base member 51.

Figure 5:
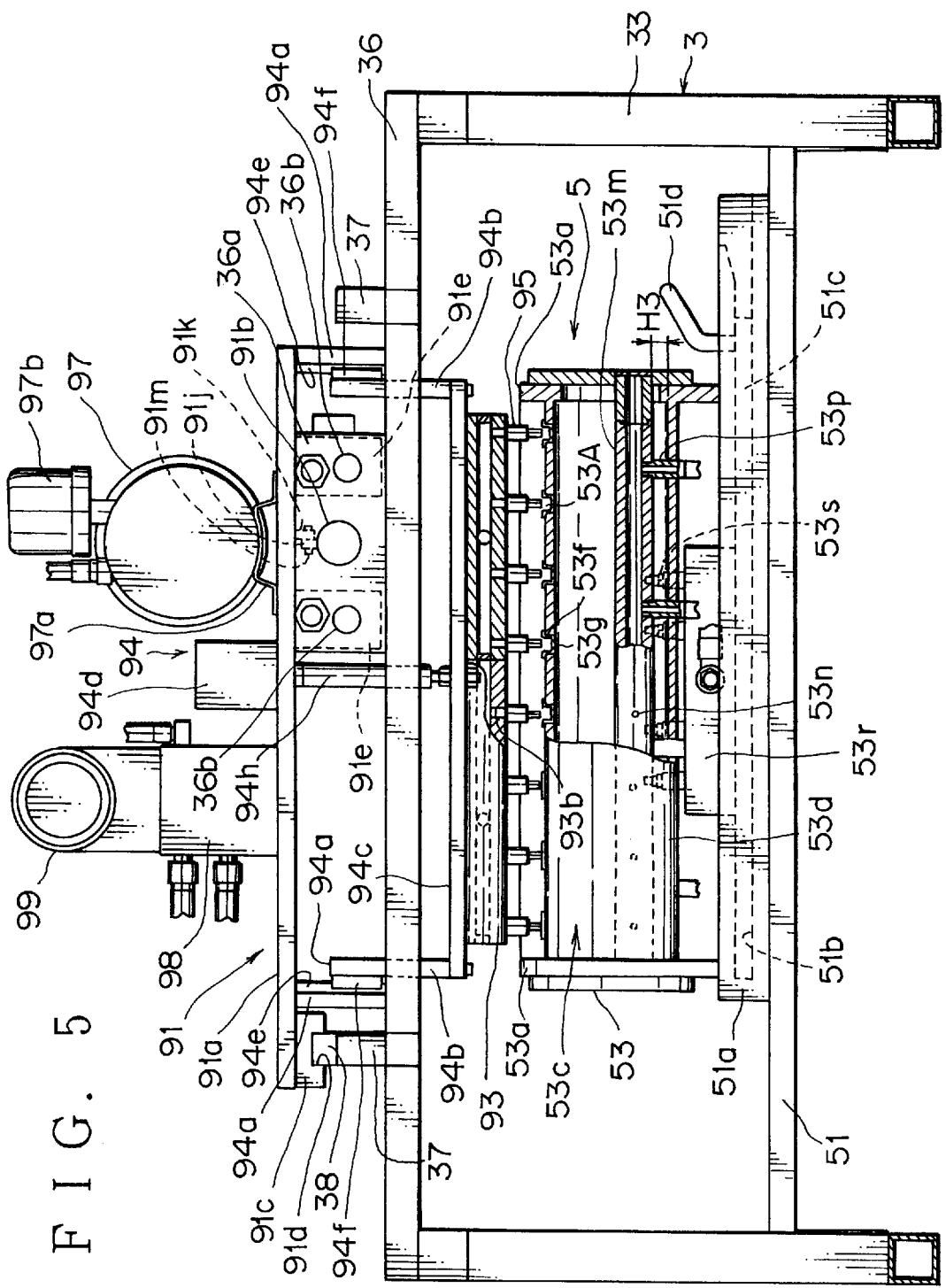
FIG. 5 is a partly cut away schematic front view of the seed feeding section and the seed transfer section of the apparatus of FIG. 2.
Figure 6:
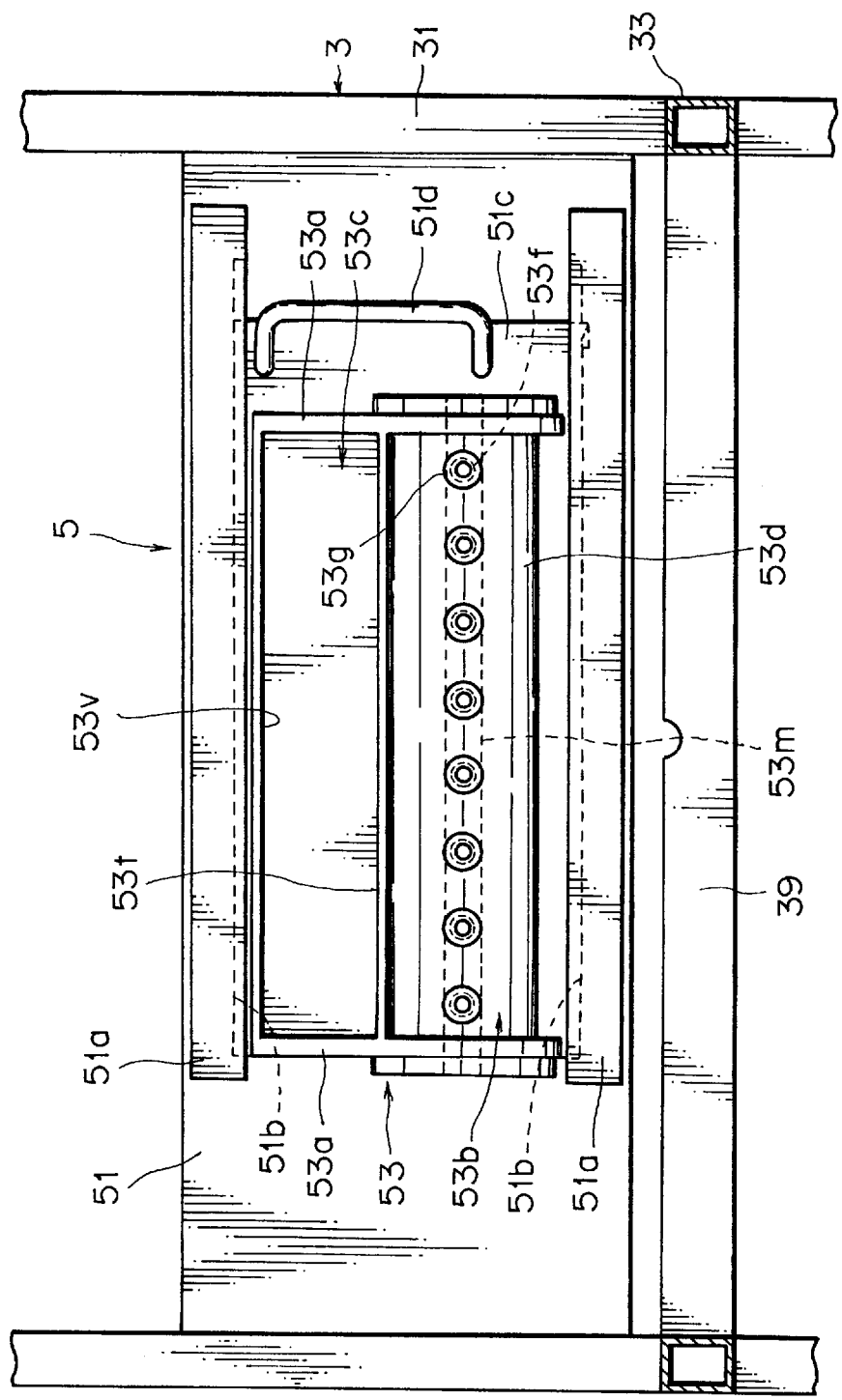
FIG. 6 is an enlarged schematic plan view of the seed feeding section of the apparatus of FIG. 2.
Figure 7:
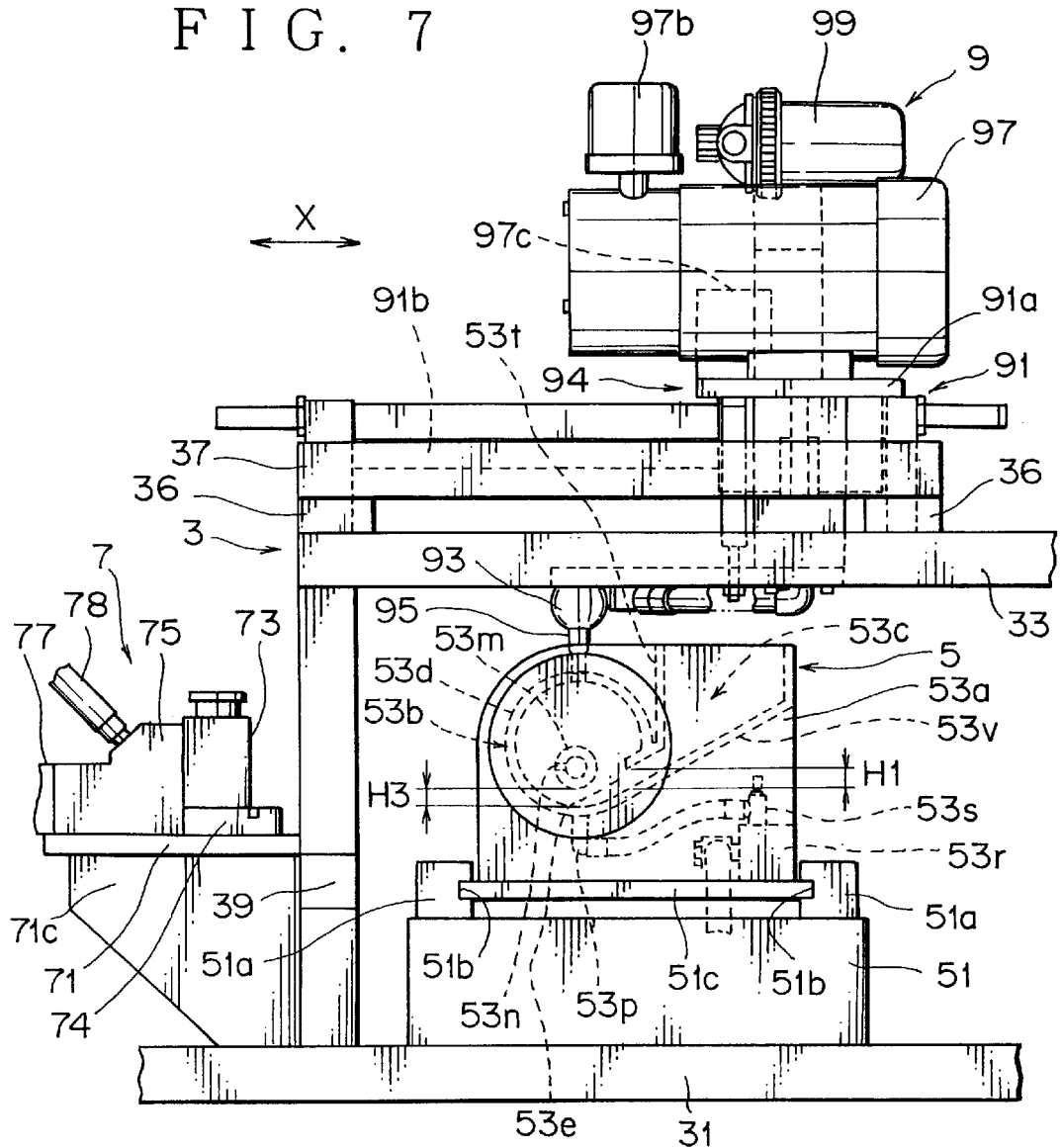
FIG. 7 is an enlarged schematic side view of the seed feeding section and the seed transfer section of the apparatus of FIG. 2.
Figure 8:
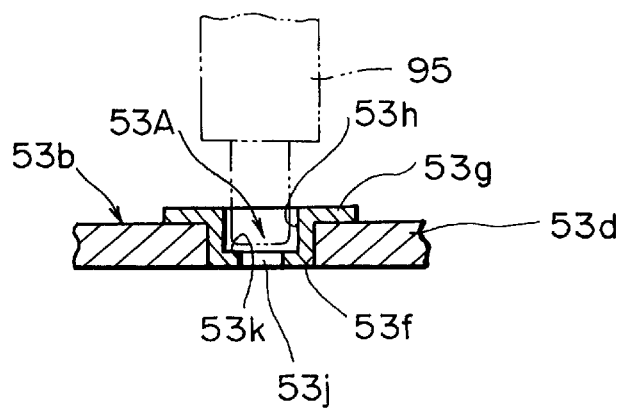
FIG. 8 is an enlarged schematic cross-sectional view of the adaptor of FIG. 5.

FIG. 5 is a partly cut away schematic front view of the seed feeding section 5 and the seed transfer section 9. FIG. 6 is an enlarged schematic plan view of the seed feeding section 5, whereas FIG. 7 is an enlarged schematic side view of the seed feeding section 5 and the seed transfer section 9. As seen from FIG. 6, the base member 51 has a laterally oblong rectangular plan view extending between the lateral frame members of the main frame 31 and a pair of guide rails 51a extend along the front and rear edges, respectively, of the base member 51.

As shown in FIG. 7, each of the guide rails 51a is provided with a guide groove 51b formed on the inner lateral wall of the guide rail in order to be engaged with and removably hold a sliding panel 51c. Thus, the sliding panel 51c can be drawn to the right in FIG. 6 to take the sliding panel 51c out of the guide grooves 51b.

Reference symbol 51d in FIG. 6 denotes a grip of the sliding panel 51c that can be used for drawing out the sliding panel 51c.

The seed tank 53 is arranged on the sliding panel 51c and is typically made of acrylic resin. As shown in FIG. 5, the seed tank 53 includes a pair of lateral walls 53a standing up in parallel with each other along the respective lateral edges of the sliding panel 51c, a tank main body 53b and a hopper 53c disposed between the lateral walls 53a.

As seen from FIG. 6, the tank main body 53b has a substantially cylindrical profile defined by a cylindrical peripheral wall 53d and closed by a pair of lateral walls 53a.

The peripheral wall 53d of the tank main body 53b is provided at a lower position thereof with a flat and oblong slit 53e extending between the lateral walls 53a. The slit 53e has a height of H1 (or the dimension of the slit).

As shown in the partly cut away view of FIG. 5, a total of eight through bores 53f are arranged at regular intervals along a horizontal line at the upper end of the peripheral walls 53d. Each of the through bores 53f can removably receive an annular adaptor 53g, that is provided substantially at the center thereof, with a through bore 53A (operating as a seed discharge port).

The peripheral wall of the through bore 53A of the adaptor 53g has a large diameter section 53h to be located on the outside of the peripheral wall 53d of the tank main body 53b and a small diameter section 53j to be located on the inside of the peripheral wall 53d of the tank main body 53b. The large and small diameter sections 53h and 53j are separated by a stepped section 53k.

Adapters 53g are provided which have through bores 53A having different inner diameters so that an adaptor 53g having the smallest through bore 53A of all the through bores 53A through which each of the seeds to be processed can pass may be selected and fitted to each of the through bores 53f.

A small cylindrical air chamber 53m horizontally extends inside the tank main body 53b between the oppositely disposed lateral walls 53a and at a height of H3 from the bottom of the tank main body 53b (or with a gap separating the bottom of the tank main body 53b and the air chamber 53m) that is substantially equal to the height H1 of the slit 53e.

The air chamber 53m is divided into two lateral sections at the middle point between the lateral walls 53a and each section of the air chamber 53m is provided with a plurality of air outlet ports 53n arranged horizontally at regular intervals along the side of the peripheral wall of the air chamber 53m opposite to the slit 53e as shown in FIGS. 5 and 7.

As illustrated in FIG. 5, a pair of couplers 53p are connected at an end thereof to each section of the air chamber 53m. Each of the couplers 53p has an outer end which extends through the bottom of the tank main body 53b to the outside of the tank main body 53b, while the inner end of each of the couplers 53p is connected to one of the couplers 53s of a manifold 53r which is rigidly secured onto the base 51 located adjacent to and behind the tank main body 53b as shown in FIG. 7.

The manifold 53r is supplied with compressed air from an air compressor (not shown) external to the gel-coating apparatus 1 by way of a pressure reducing device (not shown) and the supplied compressed air is further fed to the divided sections of the air chamber 53m via the respective couplers 53s and 53p and high pressure hoses.

The hopper 53c includes a front panel 53t standing substantially vertically from a position on the peripheral wall 53d above the upper edge of the slit 53e of the tank main body 53b. A rear panel 53v extends obliquely and upwardly from the lower edge of the slit 53e to move away from the tank main body 53b and has a substantially vertically standing front end section. The rear panel 53v is formed integrally with the peripheral wall 53d of the tank main body 53b to join the peripheral wall 53d along a longitudinal line on the bottom of the tank main body 53b.

The seeds fed to the gel-coating section 7 are coated with a gellant and become gel-coated seeds. As illustrated in FIG. 3, the gel-coating section 7 is arranged in front of the auxiliary frame 33 on the main frame 31. The gel-coating section 7 includes a substrate extending between the lateral edges of the main frame 31, a nozzle block 73 arranged on the substrate 71, a gel-containing block 75 arranged directly in front the nozzle block 73 and rigidly secured to the substrate 71, eight pressurizing air cylinders 77 and eight de-aerating valves 78 connected to the gel-containing block 75, and a manifold 79 for feeding the gel-containing block 75 with a gellant.

Figure 11:
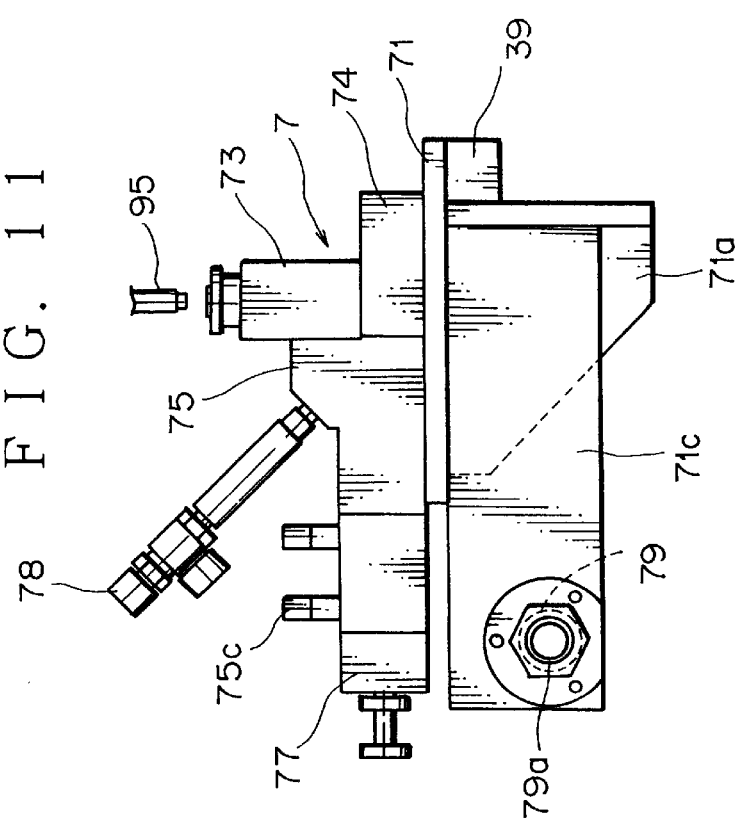
FIG. 11 is an enlarged schematic side view of the gel-coating section of the apparatus of FIG. 2.

FIG. 9 is an enlarged schematic front view of the gel-coating section, FIG. 10 is an enlarged schematic plan view of the gel-coating section, and FIG. 11 is an enlarged schematic side view of the gel-coating section. As seen from FIG. 10, the substrate 71 has a transversely oblong rectangular plan view and is mounted onto the front transverse beam 39 of the auxiliary frame 33 as shown in FIG. 3. Under this condition, the substrate 71 is horizontally supported by a pair of laterally disposed reinforcement panels projecting downwardly from the front side of the front transverse beam 39 as shown in FIG. 11.

The nozzle block 73 is arranged on a base frame 74 disposed between the lateral edges of the substrate 71 and having a substantially inverted-U-shaped front view. As shown in FIG. 10, the nozzle block 73 has a transversely oblong rectangular plan view like the substrate 71, but is longitudinally shorter than the substrate 71.

Figure 12:
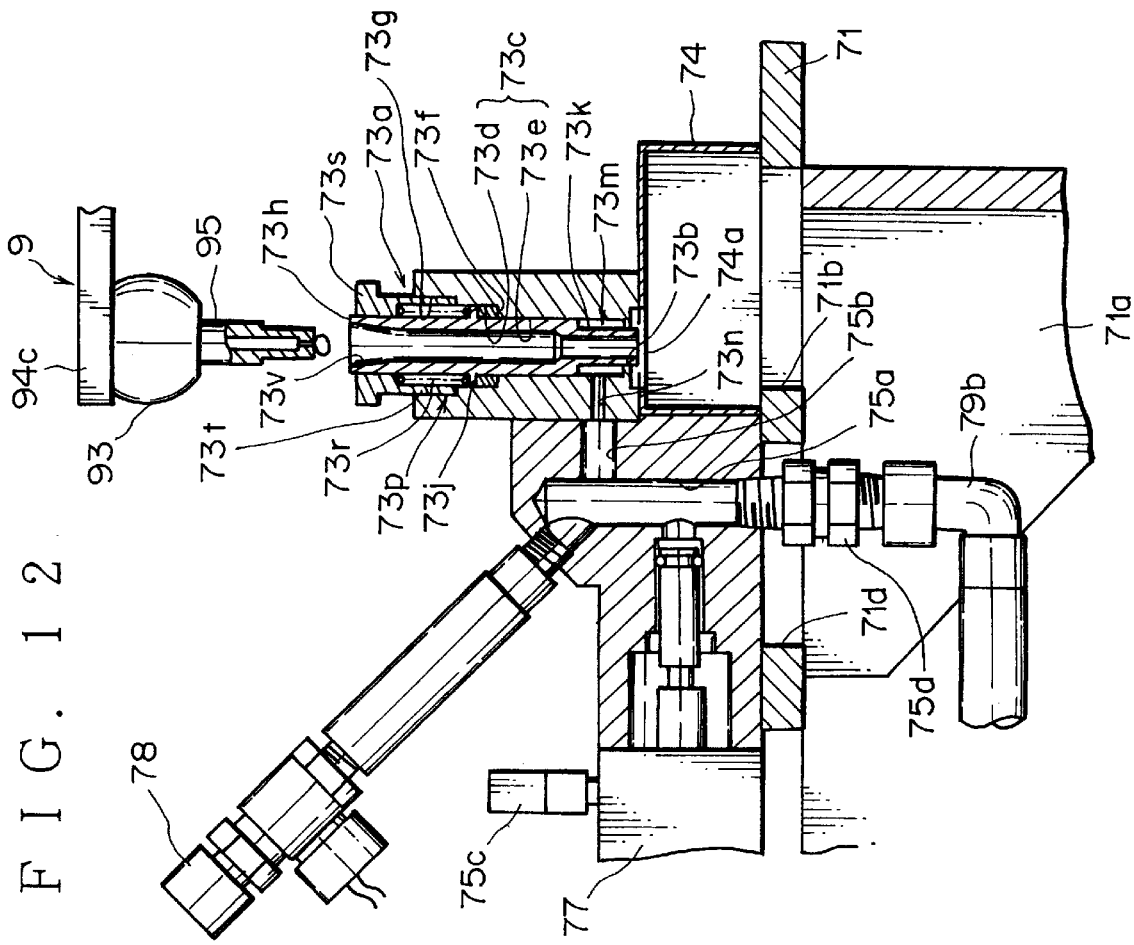
FIG. 12 is an enlarged schematic cross-sectional view of the nozzle block of the gel-coating section of FIG. 11.

A total of eight seed inlet ports 73a are transversely arranged at regular intervals on the top wall of the nozzle block 73 and eight valves 73b are arranged oppositely on the bottom wall of the nozzle block 73 exactly in correspondence to the respective seed inlet ports 73a, although the valves 73b have an inner diameter smaller than that of the seed inlet ports 73a as seen from the enlarged sectional lateral view of FIG. 12.

Each of the seed inlet ports 73a and the corresponding one of the valves 73b are held in communication with each other by way of each of a total of eight passageways 73c vertically running through the nozzle block 73.

Each of the passageways 73c communicating with the corresponding one of the seed inlet ports 73a has a large diameter section 73d with a diameter substantially equal to that of the seed inlet port 73a and a small diameter section 73e communicating with the corresponding one of the valves 73b with a diameter slightly larger than the diameter of the valve 73b. The large diameter section 73d and the small diameter section 73e are separated by a stepped section 73f located at a position slightly closer to the seed inlet port 73a from the middle point of the passageway 73c on the inner periphery thereof.

Each of the passageways 73c contains therein a vertically movable cylindrical plunger 73h. The plunger 73h has an outer diameter that corresponds to the inner diameter of the small diameter section and is provided on the outer periphery thereof with a flange 73j having an outer diameter that corresponds to the inner diameter of the large diameter section 73d of the passageway 73c. The plunger 73h is additionally provided in an area close to the end (lower end) thereof remote from the flange 73j with a reduced diameter section 73k having an outer diameter smaller than the diameter of the other end (upper end) thereof.

The plunger 73h is inserted into the passageway 73c from above through the seed inlet port 73a with the reduced diameter section 73k directed downwardly until the flange 73j abuts the stepped section 73f of the passageway 73c and the lower end thereof becomes substantially flush with the lower surface of the nozzle block 73 so that the peripheral surface of the plunger 73h is tightly in contact with the inner peripheral surface of the valve 73b in an area close to the lower end thereof but the upper end of the plunger 73h remains projecting upward from the seed inlet port 73a.

Under this condition, an annular space 73m is formed between the small diameter section 73e of the passageway 73c and the reduced diameter section 73k of the plunger 73h and held in communication with the front side of the nozzle block 73 located vis-a-vis the gel-containing block 75 by way of a through bore 73n.

Also under this condition, another annular space 73p is formed between an area of the peripheral surface of the plunger 73h close to the upper end 73h thereof and above the flange 73j, and the large diameter section 73d of the passageway 73c, to contain a coil spring 73r. The large diameter section 73d is provided with a female thread 73g, into which the male thread 73t of a cap 73s is driven so that the flange 73j is urged downwardly by the coil spring 73r which is pressed downwardly by the lower end of the male screw 73*t* of the screwed cap 73*s*.

Thus, the plunger 73*h* is urged downwardly to close the valve 73*b* with the reduced diameter section 73*k* thereof under the effect of the resilient force of the coil spring 73*r*.

In FIG. 12, reference symbol 73*v* denotes a passageway running through the plunger 73*h* and having an inner diameter substantially equal to the large diameter section 53*h* of the adapter 53*g* that is largest among the large diameter sections 53*h* of the prefabricated different adapters 53*g*.

The base frame 74 and the substrate 71 are provided in respective areas thereof facing the valves 73*b* with respective through bores 74*a* and 71*b* for allowing drops of gellant falling from the valves 73*b* to fall further down below the substrate 71.

As in the case of the adapters 53*g*, different plungers 73*h* are provided with different outer diameters for the reduced diameter sections 73*k* so that the gellant may be made to fall at a rate which is appropriate for coating the seeds moving from the seed feeding section 5 to the gel-coating section 7 in terms of the size of the seeds by selecting one of the plungers 73*h* having a reduced diameter section 73*k* which is appropriate for producing an optimal annular space 73*m* and arranging it in each of the passageways 73*c*.

As shown in FIG. 10, the gel-containing block 75 shows a transversely oblong rectangular plan view having a transverse length corresponding to that of the nozzle block 73.

As shown in FIG. 12, a total of eight downwardly open vertical gel passageways 75*a* are formed at regular intervals in the gel-containing block 75 at positions corresponding to the respective passageways 73*c* of the nozzle block 73.

Each of the gel passageways 75*a* is provided at an upper position on the rear side thereof with a horizontal through bore 75*b* that communicates with the corresponding one of the through bores 73*n* of the nozzle block 73 so that consequently, the gel passageway 75*a* communicates with the space 73*m* of the corresponding passageway 73*c* of the nozzle block 73 by way of the through bore 75*b* and the corresponding through bore 73*n* of the nozzle block 73.

Each of the pressurizing air cylinders 77 is horizontally linked to a front position of the corresponding through bore 75*b* of the gel-containing block 75 and the inside of the pressurizing air cylinder 77 is in communication with the corresponding gel passageway 75*a* at a position lower than the through bore 75*b*.

Reference symbol 75*c* in FIG. 12 denotes a speed controller for regulating the rate at which the corresponding pressurizing air cylinder 77 reciprocally moves.

Each of the gel passageways 75*a* is provided at the lower end thereof with a check valve 75*d* for checking a counter-flow of gel trying to move out of the gel passageway 75*a*.

Each of the deaerating valves 78 is inclined forwardly by about 45° and projects from a beveled top area of the front surface where the corresponding pressurizing air cylinder 77 is connected. The inside of the deaerating valve 78 is held in communication with the corresponding gel passageway 75*a* at an upper portion thereof.

As shown in FIG. 11, the manifold 79 is substantially cylindrical in shape and disposed below the pressurizing air cylinders 77 with a gap provided by the substrate 71 therebetween. As seen from FIG. 9, the manifold 79 is suspended and closed at the opposite ends by a pair of brackets 71*c* extending downward from corresponding positions of the lower surface of the substrate 71.

The manifold 79 is connected at an end thereof with a removable coupler 79*a* with the corresponding bracket 71*c* interposed therebetween, which coupler 79*a* is by turn connected to a gellant tank (not shown) by way of a high pressure hose and a pump (not shown).

The manifold 79 is provided in a rear area of the outer peripheral surface thereof with a total of eight couplers 79*b* that are arranged transversely at regular intervals such that the couplers 79*b* are connected at an end thereof to the outer peripheral surface of the manifold 79 and at the other end thereof to the corresponding respective lower ends of the gel passageways 75*a* of the gel-containing block 75 by way of respective through bores 71*d* of the substrate 71.

The seed transfer section 9 operates to move seeds from the seed feeding section 5 to the gel-coating section 7. As shown in FIG. 3, the seed transfer section 9 includes a translation stage 91 longitudinally movably supported on the gel-coating apparatus 1, a manifold 93 vertically movably supported by the translation stage 91, a suction tip 95 supported by the manifold 93 and a vacuum pump 97 rigidly held to the translation stage 91.

As shown in FIG. 7, the translation stage 91 includes a substrate 91*a* and a rodless magnet cylinder 91*b* for moving the substrate 91*a*.

As illustrated in FIG. 4, the substrate 91*a* has a transversely oblong rectangular plan view and extends between the lateral frame members of the auxiliary frame 33. As shown in FIG. 7, it is arranged horizontally above the auxiliary frame 33 and a slider 91*c* is fitted to the lower surface of the substrate 91*a* at a position close to the left frame member of the auxiliary frame 33 in FIG. 5.

It is seen from FIG. 5 that the slider 91*c* is provided on the lower surface thereof with a guide groove 91*d* and the guide groove 91*d* engagedly receives the guide rail 38 disposed on the left upper auxiliary beam 37*a*.

As seen from FIG. 4, the substrate 91*a* is disposed between the paired upper main beams 36 and collared blocks 91*e* are fitted to the lower surface of the substrate 91*a* at positions where guide shafts 36*b* are located in such a way that the guide shafts 36*b* longitudinally run through the respective collars of the blocks 91*e*.

As shown in FIG. 4, the rodless magnet cylinder 91*b* extends between the support panels 36*a* of the upper main beams 36 and also substantially at the middle of the paired guide shafts 36*b* and includes a cylinder barrel 91*f* located below the substrate 91*a* and extending between the paired blocks 91*e* at a position where it does not interfere with the substrate 91*a* and the paired blocks 91*e*.

The cylinder barrel 91*f* is provided in an upper area thereof with a slit 91*h* extending substantially along the entire length of the cylinder barrel 91*f* and in the inside with a piston yoke (not shown) that is slidingly movable between the opposite ends of the cylinder barrel 91*f* under the effect of a magnet.

The cylinder barrel 91*f* is also provided with a piston mount 91*j* that slidingly moves with the piston yoke and projects outwardly from the cylinder barrel 91*f* through the slit 91*h*. A bracket 91*k* is rigidly secured to the piston mount 91 by means of a screw 91*m* and suspended therefrom between the paired blocks 91*e* of the substrate 91*a*.

As shown in FIG. 5, the manifold 93 has a width slightly smaller than that of the seed tank 53 and, as seen from FIG. 7, is substantially cylindrical with closed circular opposite ends and supported by the substrate 91*a* by way of a lift mechanism 94.

The lift mechanism 94 includes, as illustrated in FIG. 5, a pair of lateral panels 94*a* suspended from the lower surface of the substrate 91a, a pair of lift frame members 94b arranged in the inside of the respective lateral panels 94a, a holder panel 94c arranged horizontally and held at the opposite lateral ends thereof respectively by the lift frame members 94b and an air cylinder 94d for moving the holder panel 94c up and down relative to the substrate 91a.

The lateral panels 94a are provided on the inner surfaces thereof with respective vertically extending guide rails 94e, whereas the lift frame members 94b are provided on the outer surfaces thereof with respective sliders 94f so that, as shown in FIG. 4, the guide grooves 94g arranged on the respectively outer surfaces of the sliders 94f are engaged with the respective guide rails 94e of the lateral panels 94a.

The holder panel 94c has a longitudinal length greater than the length of the substrate 91a and is so arranged that its front edge is located far ahead of the front edge of the substrate 91a when its rear edge is positioned substantially at the middle of the longitudinal length of the substrate 91a.

The air cylinder 94d is fitted to a front position on the substrate 91a located to the left of the blocks 91e, whereas the cylinder rod of the air cylinder 94d passes through the substrate 91a and is fitted onto the upper surface of the holder panel 94c by means of a joint rod 94h at a position close to the rear end of the holder panel 94c as shown in FIG. 5.

The manifold 93 is fitted onto the lower surface of the holder panel 94c along the front edge of the holder panel 94c and is provided with a pair of couplers 93a spaced apart transversely along the rear end of the peripheral wall of the manifold 93.

As shown in FIG. 5, a total of eight through bores 93b are formed through the peripheral wall of the manifold 93 at transversely regular intervals at respective bottom positions corresponding to the respective through bores 53f of the tank main body 53b.

As shown in FIG. 4, the paired couplers 93a are connected by way of respective high pressure hoses to a fork joint 94j fitted to the lower surface of the holder panel 94c at a position close to the rear end thereof relative to the air cylinder 94d.

As shown in FIG. 5, the suction tips 95 have a cylindrical profile and are removably fitted to the respective through bores 93b of the manifold 93. A suction path (not shown) is formed along the axis of each of the suction tips 95 and held in communication with the inside of the manifold 93.

As in the case of the adapters 53g of the tank main body 53, different suction tips 95 are provided with different outer diameters and inner diameters of the suction path so that optimal suction tips 59 may be selected in terms of sucking and holding seeds and fitted to the respective through bores 93b as the suction tips 95 have an outer diameter that makes them to be snugly fitted into the large diameter sections 53h of the through bores 53A of the respective adapters 53g.

The rodless magnet cylinder 91b is so designed that, when the air cylinder 94d in the lift mechanism 94 is contracted, it can be moved by a longitudinal sliding motion of its piston mount 91j between a rear position where the front ends of the suction tips 95 are located respectively above the corresponding adapters 53g of the tank main body 53b and a front position where the front ends of the suction tips 95 are located respectively above the corresponding seed inlet ports 73a of the nozzle block 73.

On the other hand, the rodless magnet cylinder 91b is also designed so that the front ends of the suction tips 95 are located slightly above the respective stepped sections 53k of the corresponding adapters 53g when the piston rod is extended at a rear position of the rodless magnet cylinder 91b and high enough to be inserted into the respective passageways 73v of the plungers 73h in the passageways 73c of the corresponding seed inlet ports 73a when the piston rod is extended at a front position of the rodless magnet cylinder 91b.

It should be noted that, when the air cylinder 94d is extended at the rear position of the rodless magnet cylinder 91b, a slight gap is formed between each of the adapters 53g and the corresponding suction tip 95 to allow the inside of the tank main body 53b to communicate with the outside of the tank main body 53b through this gap.

As shown in FIG. 5, the vacuum pump 97 is fitted onto a seat 97a at a position where it is located opposite to the blocks 91e of the substrate 91a and provided thereon with a silencer 97b. On the other hand, an air filter 99 is fitted onto the substrate 91a at a position left to the vacuum pump 97 in FIG. 5 with a manifold 98 interposed therebetween.

The vacuum pump 97 is connected to the air filter 99 by way of a high pressure hose (not shown), which air filter 99 is by turn connected to a pressure sensor 97c arranged on the substrate 91a at a position behind the gel-coating apparatus 1 if viewed from the manifold 98 as seen from FIG. 4.

Additionally, the manifold 98 is connected to a pair of couplers 93a of the manifold 93 by way of high pressure hoses (not shown) and the fork joint 94j.

The gel-hardening section 11 is designed to harden the gellant coat of each of the seeds coming from the gel-coating section 7 by causing a hardening agent to react with the gellant in order to gel-coated seeds and includes a gel-hardening tank 111, a gel-guide mechanism 113 and a hardening agent supply mechanism 115.

Figure 13:
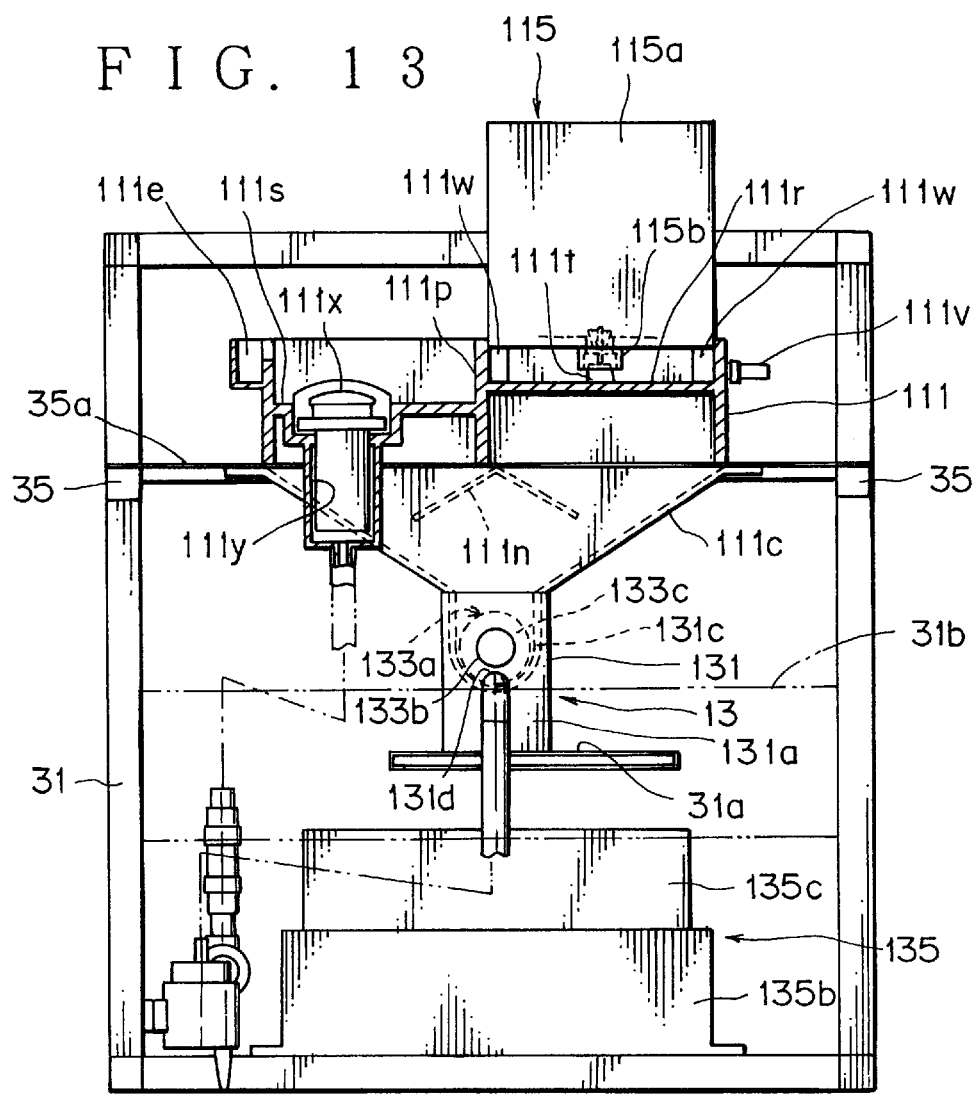
FIG. 13 is a partly cut away enlarged schematic front view of the gel-hardening section and the gel-washing section of the apparatus of FIG. 1.

FIG. 13 a partly cut away enlarged schematic front view of the gel-hardening section and the gel-washing sections of the apparatus 1, FIG. 14 is an enlarged schematic plan view of the gel-hardening section, FIG. 15 is a schematic cross-sectional view taken along line A—A of FIG. 14, and FIG. 16 is a schematic cross-sectional view taken along line B—B of FIG. 14.

As shown in FIG. 14, the gel-hardening tank 111 has a width slightly greater than that of the nozzle block 73 of the gel-coating section 7 of the gel-coating apparatus 1 and shows a rectangular plan view that is oblong in the longitudinal direction of the gel-coating apparatus 1.

The gel-hardening tank 111 is supported at the front and rear ends thereof by a pair of thin plates 35a bridging the lateral frame members of the horizontal reinforcing frame 35 of the main frame 31.

The gel-hardening tank 111 comprises a liquid supply tank section 111a, a reaction tank section 111b, a seed dropping port 111c, a liquid drainage tank section 111d and a liquid bypass 111e.

As shown in FIG. 14, the liquid supply tank section 111a is arranged in the gel-hardening tank 111 located near the rear end of the gel-coating apparatus 1 and adjacent to the reaction tank section 111b located at the front end side of the liquid supply tank section 111a in the gel-coating apparatus 1. As seen from FIG. 15, the bottom of the reaction tank section 111b is located at a level higher than the bottom of the liquid supply tank section 111a.

The liquid supply tank section 111a is provided at a longitudinal middle point thereof with a flow rectifying barrage 111g transversely standing from the bottom to a height higher than the bottom of the reaction tank section 111b but lower than the upper end of the liquid supply tank section 111a and fully extending between the lateral walls of the gel-hardening tank 111 as shown in FIG. 14. The flow rectifying barrage 111g has front and rear openings at a base section thereof.

A zone of the gel-hardening tank 111a closer to the front end of the gel-coating apparatus 1 and hence to the reaction tank section 111b than the flow rectifying barrage 111g is disposed below the eight valves 73b formed in the nozzle block 73 of the gel-coating section 7. On the other hand, as shown in FIG. 16, the gel-hardening tank 111 is provided on the bottom at a position closer to the rear end of the gel-coating apparatus 1 than the flow rectifying barrage 111g with a liquid supply port 111h and a screen panel 111j prepared by warping a plastic panel having a width smaller than that of the gel-hardening tank 111 is also arranged in the gel-hardening tank 111 at a position closer to the rear end of the gel-coating apparatus 1 than the flow rectifying barrage 111g and is suited for covering the liquid supply port 111h.

As shown in FIG. 15, the reaction tank section 111b is provided on the bottom at a position close to front end of the gel-coating apparatus 1 with a liquid blocking barrage 111k having a sloped lateral view and a height greater than that of the flow rectifying barrage 111g and smaller than that of the upper end of the gel-hardening tank 111.

The rear slope 111m of the liquid blocking barrage 111k is provided with a curved surface that is upwardly concave.

The seed dropping port 111c is located in front of and adjacent to the front edge of the liquid blocking barrage 111k and, as shown in FIG. 13, has a funnel-shaped profile with a width gradually reduced toward the bottom. It defines upper and lower passageways above and below the gel-hardening tank 111, respectively. The lower passageway is located behind the thin plate 35a supporting the front end of the gel-hardening tank 111.

Another screen panel 111n, having a sloped profile that extends transversely and downwardly, is arranged within the seed dropping port 111c.

The liquid drainage tank section 111d is arranged adjacent to the seed dropping port 111c and close to the rear end of the gel-coating apparatus 1. As shown in FIG. 14, the liquid drainage tank section 111d is divided into a tank holder section 111r located on the right side of the gel-hardening tank 111 and a purifying section 111s located on the left side of the gel-hardening tank 111 in FIG. 14 by means of a partition wall 111p arranged at the transverse middle point. The tank holder section 111r has a bottom located at a level higher than the bottom of the liquid supply tank section 111a and slightly lower than the bottom of the reaction tank section 111b and, as shown in FIGS. 13 and 14, a substantially cylindrical engaging projection 111t is standing substantially at the center of the bottom of the tank holder section 111r to a height slightly greater than the upper end of the liquid blocking barrage 111k. As seen from FIG. 13, the tank holder section 111r is additionally provided at a lateral wall thereof with a draining switch valve 111v.

Furthermore, as shown in FIG. 14, the tank holder section 111r is provided at the four corners of the bottom thereof respectively with spacers 111w. The spacers 111w have an upper end substantially flush with the upper end of the liquid blocking barrage 111k as seen from FIG. 16.

The bottom of the purifying section 111s is at a level higher than the bottom of the liquid supply tank section 111a and slightly lower than the bottom of the tank holder section 111r and provided at a position close to a lateral wall with a filter 111x for removing debris of seeds contained in the hardening agent there. A liquid discharge port 111y is arranged below the filter 111x.

As shown in FIG. 14, the partition wall 111p is provided at a front position located close to the seed dropping port 111c with a notch 111z for keeping the tank holder section 111r and the purifying section 111s in communication with each other.

The liquid bypass 111e connects a portion of a lateral wall of the reaction tank section 111b located closer to the liquid supply tank section 111a than the liquid blocking barrage 111k and a portion of a lateral wall of the liquid drainage tank section 111d and extends to a lateral side of the gel-hardening tank 111. As shown in FIG. 15, the portion of the lateral wall of the reaction tank section 111b connected to the liquid bypass 111e is covered by a comb-shaped lattice 111A for controlling the entry of seeds covered by a gellant and dropping from the valve 73b of the gel-coating section 7.

It should be noted that the liquid supply port 111h of the liquid supply tank section 111a and the liquid discharge port 111y of the purifying section 111s are connected by way of a liquid supply hose 117 and a magnet pump 119. A hardening agent tank (not shown) is connected to a portion of the liquid supply hose 117 located upstream (on the side of the drainage port 111y) of the magnet pump 119 by way of a change-over valve (not shown) for changing the supply route.

As the change-over valve is switched to the side of the hardening agent tank 111 and the magnet pump 119 is operated, the hardening agent in the hardening agent tank 111 is fed into the liquid supply tank section 111a from the liquid supply port 111h by way of the liquid supply hose 117 and then sequentially further into the reaction tank section 111b, the liquid bypass 111e and the tank holder section 111r, the partition wall 111p and the purifying section 111s of the liquid drainage tank section 111d until the level of gel-hardening agent in the entire gel-hardening tank 111 becomes flush with the level of the liquid in the liquid blocking barrage 111k located between the upper and lower end thereof.

The hardening agent discharged from the liquid discharge port 111y of the purifying section 111s is fed back into the translation stage 91 by way of the liquid supply hose 117 and the liquid supply port 111h by switching the change-over valve to the side of the liquid discharge port 111y and operating the magnet pump 119.

The gel-guide mechanism 113 includes a belt conveyor 113a, guide paddles 113b driven to rotate by the belt conveyor 113a, a motor 113c for driving the belt conveyor 111e and a power transmission section 113d for transmitting the rotary motion of the motor 113c to the belt conveyor 113a.

The belt conveyor 113a is realized by arranging a pair of pulleys 113e and connecting the pulleys 113e by means of an endless belt 113f as shown in FIG. 16.

The pulleys 113e are arranged horizontally with their respective axes directed to a portion of the liquid supply tank section 111a located closer to the reaction tank section 111b rather than to the flow rectifying barrage 111g or upstream relative to the position where the gellant drops from the valve 73b of the gel-coating section 7 and a position located upstream relative to the reaction tank section 111t and closer to the liquid supply tank section 111a than to the liquid blocking barrage 111k.

As shown in FIGS. 2 and 3, the pulleys 113e are rotatably supported at the opposite ends thereof by a pair of support plate 31f arranged in the longitudinal direction of the gel-coating apparatus 1 and located at respective positions close to the front and rear edges of the support plates 31f. The paired support plates 31f are by turn supported at the front edges thereof by the main frame 31 substantially at the middle of the main frame 31 and at the rear edges thereof by a pair of substrates 31e arranged between the lateral frame members of the main frame 31 at a position close to the front end of the main frame 31.

As seen from FIG. 1, the belt 113f has a width substantially bridging the lateral edges of the gel hardening tank 111.

As shown in FIG. 16, the guide paddles 113b are vertically standing from the surface of the belt 113f, and the belt 113f is arranged to form a longitudinally oblong ellipse having linear segments running in parallel with each other. As shown in FIG. 1, the guide paddles 113b have a substantially rectangular plan view with a width corresponding to that of the belt 113f and a height significantly smaller than the width.

Also as shown in FIG. 1, each of the guide paddles 113b is provided with a plurality of slits 113g running along the height and arranged at regular intervals and in parallel with each other.

As seen from FIG. 16, each of the guide paddles 113b is so arranged that a front end thereof, projecting from a portion of the belt 113f disposed vis-a-vis the bottom of the reaction tank section 111b, is separated from a lateral wall and the bottom of the reaction tank section 111b by a small distance, and the front end thereof, projecting from a portion of the belt 113f disposed around the rounded surface of the pulley 113e located above the liquid supply tank section 111a, is separated from the rear slope film of the liquid blocking barrage 111k by a small distance, such that the front end is movable along the rear slope 111m.

As shown in FIG. 2, the motor 113c is supported on a substrate 35c bridging the paired support plates 31f located near a longitudinal middle point of the paired substrates 31e.

The power transmission section 113d includes a reduction gear mechanism 113h linked to the output shaft of the motor 113c supported on the substrate 35c and a belt-pulley mechanism 113j arranged to link the output shaft of the reduction gear mechanism 113h and the shaft of the front side pulley 113e of the gel-coating apparatus 1.

The belt conveyor 113a is designed so that the portion thereof facing the hardening agent in the gel-hardening tank 111 is driven by the motor 113c and the power transmission section 113d from the side of the liquid supply tank section 111a to the side of the liquid discharge tank section 111d.

As shown in FIG. 13, the hardening agent supply mechanism 115 includes a reservoir tank 115a and a cap 115b.

The reservoir tank 115a is designed to store a highly concentrated hardening agent to be used to regulate the concentration of the hardening agent contained in the gel-hardening tank 111 and, as shown in FIG. 13, shows a vertically oblong rectangular front view. As shown in the plan view of FIG. 14, the reservoir tank 115a is so sized that it can be contained in the tank holder section 111r.

The reservoir tank 115a is provided at the center of the lower surface thereof with a tank opening 115c that keeps the inside of the tank 115a in communication with the outside of the tank 115a as shown in FIG. 16.

Figure 17:
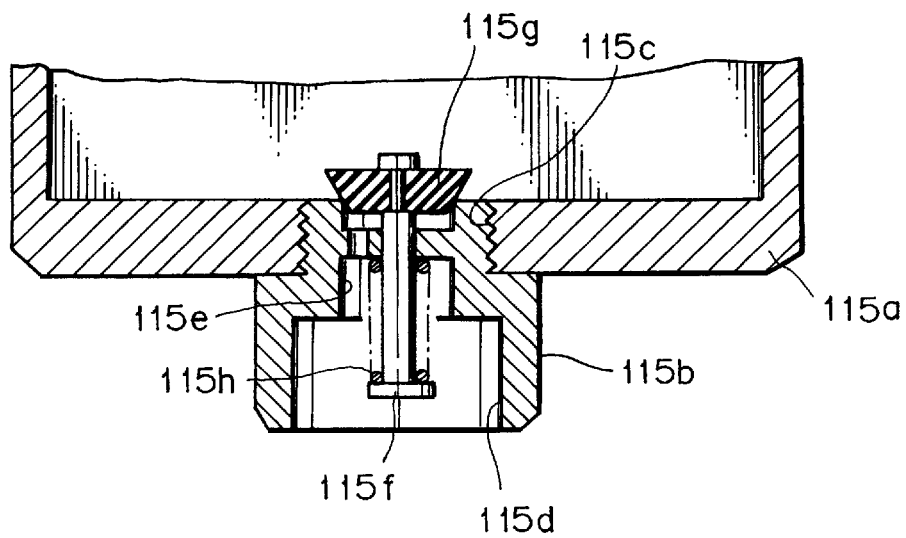
FIG. 17 is an enlarged schematic lateral view of the cap of FIG. 13.

The cap 115b is designed to hermetically seal the tank opening 115c when the cap 115b is screwed into the tank opening 115c. As shown in the enlarged lateral sectional view of FIG. 17, the cap 115b has a recess 115d on the surface that is exposed to the outside when the cap is screwed in position into the tank opening 115c and a slide pin 115 having a small diameter is made to pass through the center of the bottom area of the recess 115d. A through bore 115e is formed through the cap 115b along the slide pin 115f in order to keep the inside of the cap 115b in communication with the outside thereof.

The external end of the slide pin 115f extends into the recess 115d and the internal end thereof is located in the inside of the cap 115b and provided with a rubber peg 115g plugged into the through bore 115e. The slide pin 115f is made to project outside the cap 115b under a concerted effort of the flange arranged at an end thereof and a coil spring 111h fitted to a peripheral portion of the bottom of the recess 115d through which the slide pin 115f is inserted so that the rubber peg 115g is urged to close the through bore 115e.

When the cap 115b is screwed into the tank opening 115c and the tank 115a is received by the tank holder section 111r with the cap 115b facing downwardly, the reservoir tank 115a is so disposed that the bottom of the recess 115d of the cap 115b is located slightly above the upper end of the liquid blocking barrage 111k.

The gel-washing section 13 is designed to wash the gel-coated seeds which have already had the gellant therearound reacted with and hardened by the hardening agent in the gel-hardening section 11.

As shown in FIG. 3, the gel-washing section 13 includes a washing water tank 131, a gel-guide mechanism 133 and a gel-discharge mechanism 135.

As shown in FIG. 16, the washing water tank 131 has a length extending between the seed dropping port 111e and a longitudinal middle point of the reaction tank section 111b and is supported on a support panel 31a. The washing water tank 131 is located under the gel-hardening tank 111 at a transverse middle section of the main frame 31 as shown in FIG. 13.

Figure 18:
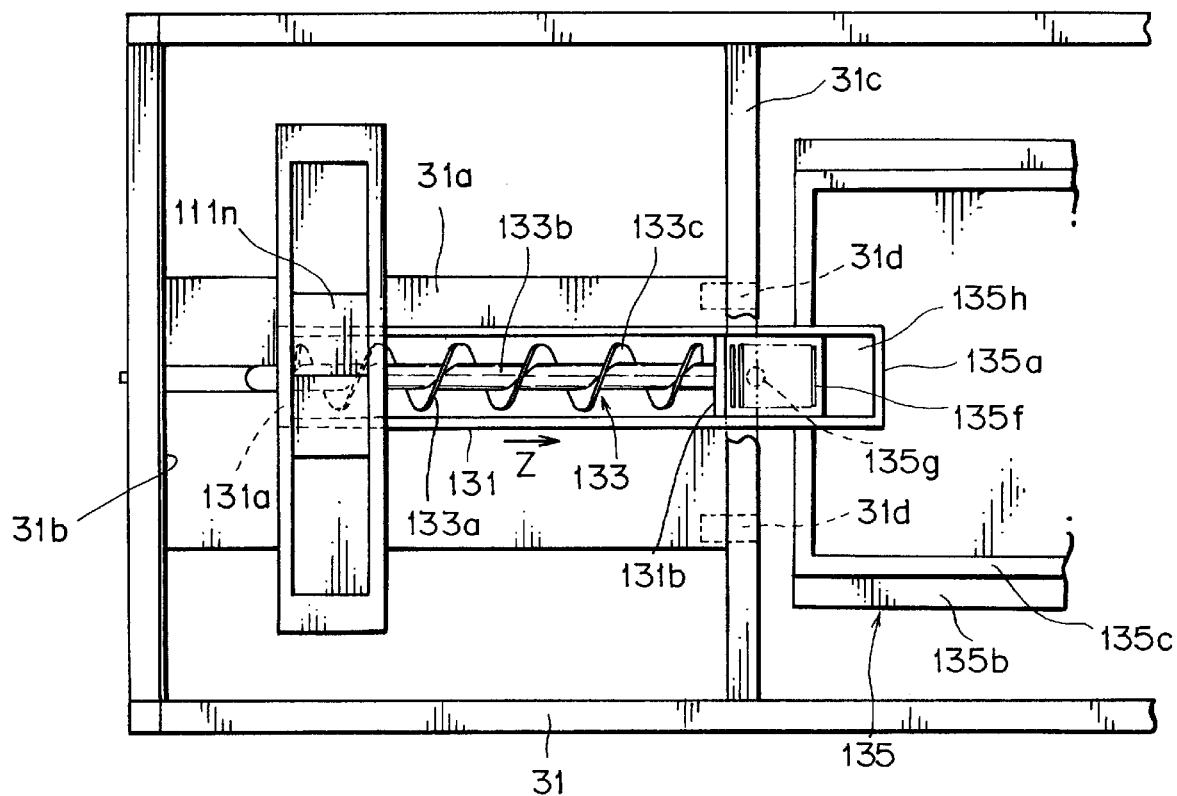
FIG. 18 is an enlarged schematic plan view of the gel-washing section of the apparatus of FIG. 1.

The support panel 31a is fitted at an end thereof to a thin plate 31b arranged horizontally between the lateral frame members of the transverse reinforcing frame 35 below the main frame 31 and at the lateral edges of the other end thereof to the lower ends of the respective thin plates 31d suspended from respective lateral positions of the reinforcing frame 35 arranged between the upper lateral members of the main frame 31 as shown in FIG. 16 and FIG. 18, which is an enlarged plan view of the gel-washing section 13.

The washing water tank 131 includes an outer frame that is open both at the top and at the bottom and has a substantially rectangular plan view and a longitudinal flank panel 131c contained in the outer frame and extending from a front panel 131a to a rear panel 131b. Washing water flows through the washing water tank 131 in order to wash the gel-coated seeds that have been processed for hardening the gellant coating on the seeds.

As shown in FIG. 13, the front panel 131a has a vertically oblong rectangular front view and is provided at the center thereof with a water supply port 131d that communicates with the inside of the washing water tank 131.

Figure 19:
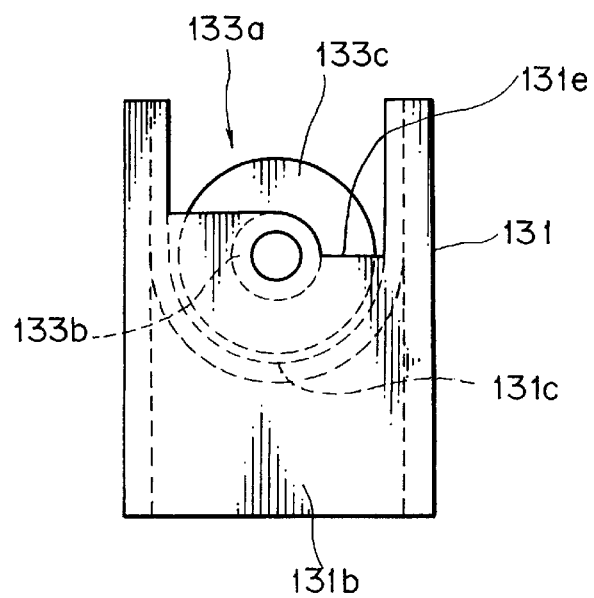
FIG. 19 is an enlarged schematic rear view of the back panel of the washing tank of FIG. 18.

As shown in the enlarged rear view of FIG. 19, the rear panel 131b is similar to that of the front panel 131a except that it is provided with an inverted-L shaped notch in the upper half area and the flank panel 131c has a U-shaped profile as viewed from the front.

As shown in FIG. 16, a pair of reinforcing panels 131f are arranged between the lower surface of the flank panel 131c and the support panel 31a, and the reinforcing panels 131f are separated from each other.

Referring to FIG. 16, reference symbol 131g denotes a drain peg for draining washing water arranged at a lower position of the flank panel 131c located close to the front panel 131.

The gel-guide mechanism 133 includes a screw feeder 133a and a motor (not shown) for driving the screw feeder 133a to rotate.

As shown in FIG. 18, the screw feeder 133a has a shaft 133b and a helical blade 133c. The shaft 133b extends along the central axis of curvature of the flank panel 131c and is rotatably supported at the opposite ends thereof by the front and rear panels 131a and 131b, respectively.

The helical blade 133c is fitted to the outer periphery of the shaft 133b extending between the front panel 131a and the rear panel 131b.

The motor (not shown) is linked to a gear 133d arranged on the front portion of the shaft 133b projecting through the front panel 131a toward the washing water tank 131 and the shaft 133b itself by way of a set of reduction gears in mesh with the gear 133d as shown in FIG. 16.

The screw feeder 133a is driven to rotate by means of the motor, the set of reduction gears and the gear 133d in order to move the gel-coated seeds in the washing water contained in the washing water tank 131 from the side of the front panel 131a toward the rear panel 131b.

The gel-discharge mechanism 135 comprises a draining box 135a, a draining pan 135b and a seed receiving basket 135c.

The draining box 135a is arranged adjacent to the rear surface of the rear panel 131b, is open at the top for a predetermined longitudinal length, and has a rectangular plan view. As shown in FIG. 18, the draining box 135a has a lateral width substantially equal to that of the washing water tank 131.

As shown in FIG. 16, the draining box 135a is provided at a longitudinal middle point with an engaging wall 135d and at a middle point between the upper end of this engaging wall 135d and the lower end of the notch section 131c on the rear surface of the rear panel 131b with an inclined draining panel 135e extending downwardly from the rear panel 131b toward the engaging wall 135d. The lower end of the draining panel 135e is engaged to a corner of the engaging wall 135d facing the rear panel 131b.

The draining panel 135e transversely extends to the full width of the draining box 135a between the upper end of the engaging wall 135d and the rear panel 131b as shown in FIG. 18 and is provided with a plurality of long transverse slits 135f in order to block gel-coated seeds coming from the washing water tank 131, while allowing water to pass therethrough.

The draining box 135a is provided at a position closer to the rear panel 131b than to the engaging wall 135d on the bottom with a water discharge port 135g for discharging the water that has passed through the slits 135f as shown in FIG. 16. The draining box 135a is additionally provided at a position opposite to the water discharge port 135g relative to the engaging wall 135d with a closable seed discharge port 135h.

The draining pan 135b is open at the top and shows a rectangular plan view. The draining pan 135b has a longitudinal length extending from a lower portion of the draining box 135a to the rear end of the main frame 31 and a width smaller than that of the main frame 31. The front and rear ends of the draining pan 135b are supported on respective lower frame members arranged transversely at the rear end and a longitudinal middle point of the main frame 31.

The draining pan 135b is provided on the bottom with a waster discharge port (not shown), which water discharge port communicates with a water discharge valve 135j arranged on the right side of the draining pan 135b in FIG. 16.

The seed receiving basket 135c is open at the top and shows a rectangular plan view. The network of the seed receiving basket 135c is so designed that it blocks gel-coated seeds and it is so sized as to be able to be put on the draining pan 135b.

The embodiment of gel-coating apparatus 1 according to the invention and having a configuration as described above operates in a manner as described below.

Before starting the operation of coating seeds with gel, eight adapters 53g whose small diameter sections 53j have an inner diameter optimal for the seeds to be processed are selected from the pool of adapters and fitted respectively to the eight through bores 53f of the tank main body 53b of the seed tank 53.

Likewise, eight plungers 73h whose reduced diameter sections 73k have an outer diameter optimal for the seeds to be processed are selected from the pool of plungers and fitted respectively into the eight passageways 73c of the nozzle block 73 of the gel-coating section 7 and, thereafter, eight coil springs 73r are put into the passageways 73c, respectively, before the caps 73s are screwed into the respective passageways 73c.

Additionally, eight suction tips 95 having outer diameters optimal for the seeds to be processed and capable of being snugly introduced into the large diameter sections 53h of the through bores 53A of the selected respective adapters 53b and whose suction paths also have an inner diameter optimal for the seeds are selected from the pool of suction tips and fitted into the through bores 93b of the eight manifolds 93 of the seed transfer section 9, respectively.

Then, the power switch (not shown) of the gel-coating apparatus 1 is turned on to contract the pressurizing air cylinders 77 of the gel-containing block 75.

At the same time, the air cylinders 94d of the lift mechanism 94 are contracted to draw up the holder panel 94c toward the substrate 91a and the piston mount 91j is made to slide backwardly by means of the rodless magnet cylinder 91b to move the manifold 93 to its backward position.

Additionally, after the power switch is turned on, the vacuum pump 97 is operated to evacuate the suction paths of the suction tips 95 by way of the manifold 93, the couplers 93a, 94j and the high pressure hoses (not shown).

Under this condition, since the manifold 93 is arranged between the vacuum pump 97 and the suction tips 95 and the suction tips 95 are evacuated by way of the manifold 93, the suction tips 95 are subjected to an equalized suction pressure.

After the power switch is turned on, the change-over valve is switched to the side on which the hardening agent tank is located to feed the gel-hardening tank 111 with the hardening agent stored in the hardening agent tank by means of the magnet pump 119.

Under this condition, the hardening agent led into the liquid supply tank section 111a from the liquid supply port 111h flows over the flow rectifying barrage 111g or through the front and rear openings at a base section thereof into the liquid supply tank section 111a located opposite to the liquid supply port 111h and further into the reaction tank section 111b to fill the entire gel-hardening tank 111.

It should be noted that the operation of the magnet pump 119 is suspended when the hardening agent fed from the hardening agent tank into the gel-hardening tank 111 gets to a predetermined level in the gel-hardening tank 111 between the upper and lower ends of the liquid blocking barrage 111k and resumed when the change-over valve is switched to the liquid discharge port 111y.

Thus, after a given amount of hardening agent is fed into the gel-hardening tank 111 from the hardening agent tank, the hardening agent discharged from the liquid discharge port 111y of the purifying section ills is fed back into the liquid supply tank section 111a by way of the liquid supply hose 117 and the liquid supply port 111h.

When the gel-hardening tank 111 is filled with the hardening agent fed from the hardening agent tank and when the hardening agent in the purifying section 111s is fed back into the liquid supply tank section 111a by way of the liquid discharge port 111y, the liquid supply hose 117 and the liquid supply port 111h, a flow of hardening agent from the liquid supply tank section 111a toward the reaction tank section 111b, the liquid bypass 111e, the tank holder section 111r of the liquid drainage tank section hid and the purifying section 111s is produced because the hardening agent in the liquid supply tank section 111a flows into the reaction tank section 111b from above and under the flow rectifying barrage 111g.

Then, when a predetermined amount of hardening agent is fed from the hardening agent tank and the hardening agent in the gel-hardening tank 111 gets to a predetermined level between the upper and lower ends of the liquid blocking barrage 111k, the reservoir tank 115a is placed in the tank holder section 111t with the cap 115b facing downwardly.

Under this condition, the engaging projection 111t of the tank holder section 111r is inserted into the recess 115d of the cap 115b and the front end of the engaging projection abuts the slide pin 115f to push the slide pin 115f into the inside of the cap 115 against the urging force of the coil spring until the rubber peg 115g is separated from the through bore 115e of the cap 115b to produce a space between the through bore 115e and the peripheral surface of the slide pin 115f.

It should be noted that, since the through bore 115e of the cap 115b that is made open as the rubber peg 115g is separated therefrom is located slightly above the front end of the slide pin 115f pushed in by the engaging projection 111t and the level of the hardening agent in the gel-hardening tank 111 is located between the upper and lower ends of the liquid blocking barrage 111k as pointed out above, the highly concentrated hardening agent in the reservoir tank 115a would not flow into the gel-hardening tank 111 so long as the hardening agent remains to the current level.

Then, the motor 113c of the gel-guide mechanism 113 of the gel-hardening section 11 is operated to cause the belt conveyor 113a to move along the circulation of hardening agent in the gel-hardening tank 111.

At the same time, the motor of the gel-washing section 13 is operated to drive the screw feeder 133a to rotate and cause the washing water in the washing water tank 131 to flow from the front panel 131a toward the rear panel 131b and slightly overflow through the notch 131e of the rear panel 131b.

Then, the gel-coated seeds in the washing water tank 131 are moved from the side of the front panel 131a toward the rear panel 131b.

It should be noted that the water overflowing through the notch 131e of the rear panel 131b then enters the draining box 135a and passes through the slits 135f of the draining panel 135e before it is discharged out of the washing water tank 131 through the discharge port 135g and fed back to the washing water tank 131 through the water supply port 131d.

As the power switch is turned on, the inside of the gellant tank is put under positive pressure by an air compressor (not shown) to move the gellant under pressure in the gellant tank into the manifold 79 by way of the high pressure hose, the pump and the rubber pipe coupler 79a until the manifold 79 is filled with gellant.

Then, the gellant filled in the manifold 79 is fed under pressure to the gel passageways 75a of the gel-containing block 75 from the lower ends thereof by way of the corresponding eight couplers 79b.

It should be noted that, since the manifold 79 is arranged between the gellant tank and the gel-containing block 75 and the gellant is fed to the gel passageways 75a of the gel-containing block 75 by way of the manifold 79, an equalized pressure is applied to the gellant in the gel passageways 75a so that gellant is fed to the gel passageways 75a at a constant rate.

The deaerating valve 78 is left open to deaerate upper areas of the gel passageways 75a to which gellant is fed from below so that the gel passageways 75a may be completely filled with gellant.

Subsequently, the gellant fed from the gellant tank under pressure is further fed to the spaces 73m of the passageways 73c of the nozzle block 73 by way of the gel passageways 75a, through bores 75b and 73n in order to completely fill the spaces 73m, when the deaerating valve 78 is closed.

It should be noted that, while gellant is fed to the gel passageways 75a, any counterflow of gellant from the gel passageways 75a to the manifold 79 is blocked by the check valves 75d arranged at the bottoms of the gel passageways 75a.

Under this condition, the pressurizing air cylinder 77 is extended to apply pressure to the inside of the gel passageways 75a and raise the pressure of the spaces 73m filled with gellant by way of the through bores 75b and 73n.

Then, each of the plungers 73h is moved upwardly through the corresponding passageways 73c against the resilient force of the coil spring 73r to open the thus far closed valve 73b at the lower end of the reduced diameter section 73k so that the given amount of gellant filling the space 73m is pushed downwardly in the nozzle block 73 through the valve 73b by the internal pressure of the space 73m and eventually falls as drops of gellant.

The pressurizing air cylinder 77 is contracted as the gellant falls as drops from each of the valves 73b, the internal pressure of the space 73m is reduced along with the amount of gellant in the space 73m until the resilient force of the coil spring 73r exceeds the internal pressure of the space 73m, when the plunger 73h is urged to move downwardly through the passageway 73c by the coil spring 73r and close the valve 73b at the lower end of the reduced diameter section 73k.

It should be noted that, as the valve 73b is closed, a film is formed at the lower end of the reduced diameter section 73k by the gellant adhering there.

It should be also noted that the gellant consumed by way of the valves 73b is replaced by additional gellant sent into one gel passageways 75a by way of the manifold 79 under the effect of the high pressure in the gellant tank.

Then, seeds are introduced into the hopper section 53c of the seed tank 53 of the seed feeding section 5.

The introduced seeds fall along the slope of the rear panel 53v and are received in the tank main body 53b through the slit 53e.

The rate of supply of seeds through the slit 53e is defined by the height H1 of the slit 53e so that the amount of seeds contained in the tank main body 53b is substantially constant regardless of the amount introduced into the hopper section 53c.

It should be noted that the rate of supply of seeds fed into the tank main body 53b from the hopper section 53c is also controlled to some extent by the gap H3 between the inner peripheral surface of the bottom portion of the tank main body 53b and the air chamber 53m.

As the tank main body 53b is filled with seeds to a given extent, the air compressor (not shown) is operated to supply compressed air to the air chamber 53m by way of the manifold 53r.

Then, compressed air is blown out through the air outlet ports 53n of the air chamber 53m to produce an air flow circulating from the lower end of the tank main body 53b to the front end, the upper end and the rear end of tank main body 53b. The air flow agitates the seeds in the tank main body 53b.

Since the manifold 53r is interposed between the air compressor and the air chamber 53m of this embodiment and compressed air is sent to the air outlet ports 53n by way of this manifold 53r, air is blown out from the air outlet ports 53n with an equalized pressure.

The rate of agitation of seeds in the tank main body 53b is determined by the flow rate of seeds made to run through the gap between the air chamber 53m and the inner peripheral surface of the bottom portion of the tank main body 53b and further from the lower end toward the front end of the tank main body 53b by the air flow circulating through the lower end, the front end, the upper end, the rear end and then the lower end again in the tank main body 53b. In other words, the rate of agitation of seeds in the tank main body 53b is determined by the gap H3 between the air chamber 53m and inner peripheral surface of the bottom portion of the tank main body 53b.

Subsequently, the air cylinder of the lift mechanism 94 is extended, while the manifold 93 is left at the rear position, in order to lower one holder panel 94c from the substrate 91a until the front ends of the suction tips 95 abut the corresponding stepped sections 53k of the respective adapters 53g of the tank main body 53b.

As a result, seeds moving in the tank main body 53b and coming very close to the suction tips 53f are attracted by the suction tips 95, respectively, and held there.

After the lapse of a predetermined time after the extension of the air cylinder 94d, the air pressure in the manifold 98 is detected by the pressure sensor 97c and, if the air pressure exceeds a predetermined level, it is determined that the negative pressure of at least some of the suction tips 95 has not fallen to a predetermined pressure level good for holding seeds there and therefore all the suction tips 95 are not holding seeds. If such is the case, the operation of sucking seeds by means of the vacuum pump 97 is temporarily suspended and the air cylinder 94d is contracted to pull up the holder panel 94c toward the substrate 91a to regain the initial state.

After the air cylinder 94d is fully contracted, the operation of the vacuum pump 97 is resumed.

On the other hand, if the air pressure detected by the pressure sensor 97c in the manifold 98 is under the predetermined level, the operation of the vacuum pump 97 is kept on and the air cylinder 94d is contracted to pull up the holder panel 94c toward the substrate 91a, while all the suction tips 95 are holding respective seeds.

Since the inside and the outside of the tank main body 53b are held in communication with each other through the small gaps between the suction tips 95 and the corresponding adapters 53g even when the suction tips 95 are holding respective seeds, part of the air flow formed by the compressed air blow out of the air outlet ports 53n in the inside of the tank main body 53b is directed to the outside of the tank main body 53b through the slight gaps between the front ends of the suction tips 95 and the through bores 53A of the corresponding adapters 53g.

Thus, some of the seeds being agitated in the tank main body 53b are guided toward the through bores 53A of the adapters 53g by the air flow running toward the outside of the tank main body 53b.

If debris of seeds produced when seeds collide with the inner wall of the tank main body 53b and small pieces of dirt entered into the tank main body 53b through the adapters 53g are made to circulate with seeds by the flow of compressed air blown in through the air outlet ports 53n while the suction tips 95 are holding respective seeds, the suction tips 95 may draw in such debris of seeds and pieces of dirt.

However, the undesired foreign objects drawn in by the suction tips 95 are removed by the air filter 99 arranged adjacent to the vacuum pump 97 to purify the circulating air so that no clogging of the suction tips 95 nor overheating of the vacuum pump 97 due to an overload condition would occur.

For replacing the adapters 53g of the seed feeding section 5 and servicing the seed tank 53, the sliding panel 51c is moved along the guide grooves 51b of the guide rails 51a by holding the grip 51d with one's hand until the seed tank 53 is drawn out of the corresponding end of the main frame 31 so that the tank 53 can be serviced without affecting the seed transfer section 9 located above the seed feeding section 5.

While the suction tips 95 are holding respective seeds, the air cylinder 94d is contracted to pull up the holder panel 94c toward the substrate 91a as described above and subsequently the piston mount 91j is made to slide forwardly to move the manifold 93 to the front position by means of the rodless magnet cylinder 91b.

Then, the air cylinder 94d is extended to move the holder panel 94c down and away from the substrate 91a until the front ends of the suction tips 95 are brought to a level where they can be introduced into the corresponding passageways 73v of the plungers 73h in the respective passageways 73c from the corresponding seed inlet ports 73a of the nozzle block 73.

Thereafter, the operation of the vacuum pump 97 is suspended to cause the suction tips 95 to release the respective seeds and then positive pressure is applied to the suction tips 95 to cause the seeds to fall from the respective suction tips 95 into the corresponding passageways 73v of the respective plungers 73h.

After the operation of the vacuum pump 97 is suspended and the seeds are released from the suction tips 95 to fall into the corresponding passageways 73v of the respective plungers 73h, the air cylinder 94d is contracted again to pull up the holder panel 94c toward the substrate 91a and the piston mount 91j is made to slide backwardly by the rodless magnet cylinder 91b until the manifold 93 is returned to the rear position to restore the initial state.

As apparent from the above description, the seed transfer section 9 moves seeds from the seed feeding section 5 to the gel-coating section 7 along the arrow X in FIG. 4 and the arrow X in FIG. 7, if viewed from above. In other words, the arrows indicate the horizontal component of the movement of the seeds.

As the seeds held by the suction tips 95 are released to fall into the corresponding plungers 73h in a manner as described above, each of the seeds is placed on the film of gellant formed at the lower end of the reduced diameter section 73k of the corresponding plunger 73h and the pressurizing air cylinder 77 is extended in synchronism with the placement of the seed.

As a result, the air pressure in the spaces 73m is raised by way of the gel passageways 75a and the through bores 75b and 73n to push up the plungers 73h and open the valves 73b so that the gellant in each of the spaces 73m is pushed out by a given amount through the valve 73b to a lower area of the nozzle block 73 until it gets to the corresponding film of gellant carrying a seed thereon and wraps the seed, before the gel-coated seed drops into the gel-hardening tank 111 located below the substrate 71 by way of the corresponding through bores 74a and 71d of the respective substrates 74 and 71.

Here again, any counterflow of gellant from the gel passageway 75 toward the manifold 79 is blocked by the check valve 75d.

Thereafter, the pressurizing air cylinder 77 is contracted to lower the plungers 73h and close the valves 73b so that a film of gellant is formed at the lower end of the reduced diameter section 73k of each of the plungers 73h and the gellant consumed by the seed dropping from the valve 73b of each of the plungers 73h is replaced by the gellant supplied from the gellant tank through the manifold 79 and the corresponding gel passageway 75a.

The above-described operations of the seed feeding section 5, the gel-coating section 7 and the seed transfer section 9 are controlled in a concerted manner by a sequencer (not shown). A total of eight gel-coated seeds are produced simultaneously in a single operational cycle of the above-described embodiment and then made to fall into an area of the liquid supply tank section 111a located closer to the reaction tank section 111b than to the flow rectifying barrage lug of the gel-hardening tank 111, where they are dipped in the hardening agent.

On the other hand, as seeds are made to fall into an area of the liquid supply tank section 111a located closer to the reaction tank section 111b than to the flow rectifying barrage 111g of the gel-hardening tank 111, where they are dipped in the hardening agent, the seeds are moved toward the reaction tank section 111b by the flow of hardening agent in the gel-hardening tank 111. Then, the seeds enter the reaction tank section 111b and come slightly close to the liquid blocking barrage 111k, where the seeds are pushed by the guide paddle 113b dipping in the hardening agent away from the liquid supply tank side and the seeds are guided toward the liquid blocking barrage 111k immersed in the hardening agent under the effect of the rotating belt conveyor 113a.

Meanwhile, the hardening agent in the reaction tank section 111b is led out of the guide paddle 113b toward the liquid supply tank section 111a through the slits 113g or through the slight gap between the guide paddle 113b and the lateral walls and the bottom of the reaction tank section 111b.

Thus, no significant disturbance occurs in the flow of hardening agent due to the movement of the guide paddle 113b through the hardening agent. Neither the hardening agent would overflow from the gel hardening tank 111 nor would the hardening agent infiltrate into the seed dropping port 111c, riding over the liquid blocking barrage 111k.

As the gel-coated seeds are guided by the guide paddle 113b to an area of the reaction tank section 111b located in front of the liquid blocking barrage 111k, the guide paddle 113b reversely turns up as the belt 113 rotates so that the front end of the guide paddle 113b follows the slope 111 of the liquid blocking barrage 111k although it is separated from the slope film by a short distance.

Then, the seeds in the hardening agent are pushed to ride on the slope film of the liquid blocking barrage 111k by the guide paddle 111b as a result of the reverse turning action of the guide paddle 113b, and the instant when the front end of the guide paddle 113b goes above the top of the liquid blocking barrage 111k, the seeds ride over the slope film of the liquid blocking barrage 111k and roll down along the other slope of the barrage until they fall into the seed dropping port 111c.

As described above, the gel-coated seeds released to drop from the valves 73b of the plungers 73h of the nozzle block 73 are immersed in the hardening agent for a given period of time until they are thrown into the seed dropping port 111c, during which period the gellant reacts with the hardening agent to become hardened to produce hardened gel-coated seeds that subsequently fall in an area of the washing water tank 131 close to the front panel 131*a* in a smooth action due to the sloped profile of the inner lateral walls of the seed dropping port 11*c* and that of the screen panel 111*n,* if the hardening agent may slightly stick to the walls and the screen panel 111*n.*

As apparent from the above description, the seed guide mechanism 113 of the gel-hardening section 11 guides coated seeds dipped in the hardening agent of the gel-hardening tank 111 from the liquid supply tank section 111*a* to the seed dropping port 111*c* over the liquid blocking barrage 111*k* along the arrow Y in FIG. 16. In other words, the arrow Y indicates the horizontal component of the guided movement of the seeds.

It should be noted that, as the coated seeds fall from the valves 73*b* of the plungers 73*h* of the nozzle block 73 and become immersed in the hardening agent for a predetermined period of time for hardening, the hardening agent becomes less concentrated and loses its volume until the level of the hardening agent in the gel-hardening tank 111 falls under a predetermined level between the upper and lower ends of the liquid blocking barrage 111*k* and also under the through bore 115*e* of the cap 115*b* that is made open as the rubber peg 115*g* is moved away.

Then, the highly concentrated hardening agent stored in the reservoir tank 115*a* is made to flow into the tank holder section 111*r* through the gap between the peripheral surface of the slide pin 115*f* that abuts and is bushed by the engaging projection 111*t* of the tank holder section 111*r* and the through bore 115*e* of the cap 115*b* and mixed with the hardening agent flowing into the tank holder section 111*r* from the reaction tank section 111*b* by way of the liquid bypass 111*e,* from which the hardened gel-coated seeds have been removed.

Thus, the concentration of the hardening agent in the gel-hardening tank 111 is raised by the high concentration hardening agent flowing into from the reservoir tank 115*a* and the hardening agent in the tank 115*a* restores the predetermined level. Then, the rubber peg 115*g* is put back into the through bore 115*e* of the cap 115*b* to close the cap 115*b* and stop the flow of hardening agent into the gel-hardening tank 111.

Consequently, the hardening agent in the gel-hardening tank 111 is constantly held to the predetermined level between the upper and lower ends of the liquid blocking barrage 111k and the concentration of the hardening agent is held to a level good for hardening the gel coat of the seeds to be processed.

Subsequently, the gel-coated seeds that have fallen in an area of the washing water tank 131 close to the front panel 131a are guided toward the rear panel 131b by the water flow generated in the washing water tank 131 by the rotary motion of the screw feeder 133a driven by the motor (not shown) and the apparent forward movement of the immersed helical blade 133c from the front panel 131a to the rear panel 131b given rise to by the rotation of the screw feeder 133a.

When the gel-coated seeds get to a position immediately in front of the rear panel 131b, they are taken up from the washing water by a portion of the helical blade 133c located close to the rear panel 131b and turning upwardly by the rotation of the screw feeder 133a.

Thus, the gel-coated seeds that have fallen from the seed dropping port 111c of the gel-hardening tank 111 into an area of the washing water tank 131a are immersed in the washing water of the tank 131a and washed for a predetermined period of time as they are moved until taken up by the helical blade 133c.

Then, the portion of the helical blade 133c that has taken up the gel-coated seeds from the washing water is inclined toward the rear panel 131b by the rotation of the screw feeder 133a so that the seeds are moved along the inclined area of the helical blade 133c until they ride over the edge of the notch 131e of the rear panel 131b and are discharged onto the draining panel 135e.

During the period from the time when the eight gel-coated seeds leave the tank main body 53a of the seed tank 53 to the time when they enter the seed dropping port 111c of the gel-hardening tank 111, the seeds and the gellant covering the seeds are moved and processed simultaneously and transversely in the gel-coating apparatus 1 substantially on a single transverse line. Thereafter, however, as the width of the seed dropping port 111c is reduced, the seeds are put together into a group and washed together in the gel-washing section 13.

The draining panel 135e allows the washing water discharged with the seeds by the helical blade 133c and the water adhering to the gel-coated seeds to fall through the slits 135f and be discharged out of the draining box 135a through the water discharge port 135g.

The drained gel-coated seeds on the draining panel 135e are made to roll down along the slope of the draining panel 135e and are discharged out of the draining box 135a through the seed discharge port 135h and are collected by the seed basket 135c.

The washing water adhering to the gel-coated seeds in the seed basket 135c is made to fall down due to its own weight through the pores of the network of the seed basket 135c. The washing water then flow onto the bottom of the draining pan 135b and out of the draining pan 135b through the water discharge valve 135j.

As is apparent from the above description, the seed guide mechanism 133 of the gel-washing section 13 guides gel-coated seeds dipped in the washing water of the washing water tank 131 from the front panel 131a toward the notch 131e of the rear panel 131b along the direction of the arrow Z in FIG. 16 and the arrow Z in FIG. 18. In other words, the arrow Z indicates the horizontal component of the guided movement of the seeds.

Thus, in the above embodiment of gel-coating apparatus 1 according to the present invention, a total of eight through bores 53f having a substantially circular plan view are arranged transversely at regular intervals in an upper area of the peripheral wall 53d of the tank main body 53b at positions corresponding to the suction tips 95 of the seed transfer section 9 for holding seeds contained in the tank main body 53b of the seed tank 53 of the seed feeding section 5 on a one-by-one basis in order to move them to the gel-coating section 7, where the seeds are coated with a gellant. Annular adapters 53g having at the center thereof respective through bores 53A are removable fitted to the respective through bores 53f in such a way that the inner peripheral surface of each of the through bores 53A is provided with a large diameter section 53h capable of receiving a corresponding suction tip 95 on the side of the outer peripheral surface of the peripheral wall 53d and a small diameter section 53j smaller than the large diameter section 53h and capable of allowing seeds to pass therethrough from the tank main body 53b on the side of the inner peripheral surface of the peripheral wall 53d.

In the above arrangement, when a suction tip 95 is fitted into each of the through bores 53A of the adapter 53g in such a way that the front end thereof is located vis-a-vis the stepped section 53k separating the large diameter section 53h and the small diameter section 53j, a small gap is produced between the suction tip 95 and the adapter 53g to allow part of the air flow generated in the tank main body 53b by the compressed air blown out of the air outlet ports 53n of the air chamber 53m in the tank main body 53b to pass therethrough and are directed to the outside of the tank main body 53b.

Consequently, the seeds contained and agitated in the tank main body 53b can be guided to the through bores 53A of the adapters 53g and made to be securely held by the suction tips 95 by means of the air flow directed to the outside of the tank main body 53b regardless of the amount of seeds contained in the tank main body 53b.

Additionally, the above embodiment of gel-coating apparatus 1 according to the invention and having through bores 53f in an upper area of the peripheral wall 53d of the tank main body 53b for respectively receiving removable annular adapters 53g to provide through bores 53A for receiving by turn respective suction tips 95 can be manufactured in a simple way because it does not involve a cumbersome operation of preparing a cylindrical peripheral wall 53d for the tank main body 53b provided with through bores 53A, each having a complicated profile of having a large diameter section 53h and a small diameter section 53j separated by a stepped section 53k.

Still additionally, since each of the adapters 53g designed to be removably fitted into the corresponding through bores 53f of the peripheral wall 53d of the tank main body 53b is provided with a through bore 53A running along the axis of the adaptor 53g for receiving a suction tip 95, a suction tip 95 having an outer diameter and an inner diameter of the air flow path optimal for the size of the seeds to be coated with gellant can be used by selecting an adaptor 53g having a matching through bore 53A so that consequently a through bore 53A appropriate for the seeds to be processed and the profile of the suction tip 95 can easily be arranged in position.

Still additionally, in the above embodiment of gel-coating apparatus 1 according to the present invention, the amount of seeds agitated in the tank main body 53b by a flow of compressed air blown out of the air outlet ports 53n of the air chamber 53m is determined by the distance H3 between the inner peripheral surface of the bottom of the tank main body 53b and the air chamber 53m so that the rate of agitation of seeds to be processed within the tank main body 53b can be held to a constant level regardless of the amount of seeds contained in the tank main body 53b.

Furthermore, in the above embodiment of gel-coating apparatus 1 according to the present invention, a hopper section 53c is arranged adjacent to the tank main body 53b of the seed tank 53 so that the seeds fed into the hopper section 53c are transferred to the inside of the tank main body 53b by way of a slit 53e that holds the inside of the hopper section 53c and the inside of the tank main body 53b in communication with each other.

In this arrangement, as long as seeds to be processed are sufficiently supplied to the hopper section 53c, seeds are fed from the inside of the hopper section 53c to the inside of the tank main body 53b at a rate determined by the height HI of the slit 53e. In other words, seeds can be quasi-automatically fed from the hopper section 53c to the inside of the tank main body 53b as the seeds in the seed transfer section 9 are transferred to the gel-coating section 7 without constantly monitoring the quantity of seeds remaining in the tank main body 53b if a sufficient amount of seeds is supplied to the hopper section 53c in advance.

In the above embodiment of gel-coating apparatus 1 according to the present invention, the quantity of seeds fed from the hopper section 53c of the seed feeding section 5 to the tank main body 53b is determined principally by the height H1 of the slit 53e holding the inside of the hopper section 53c in communication with the inside of the tank main body 53b regardless of the quantity of seeds supplied to the hopper section 53c and, to a small extent, by the height H3 from the inner peripheral surface of the bottom of the tank main body 53b to the air chamber 53m.

Figure 20:
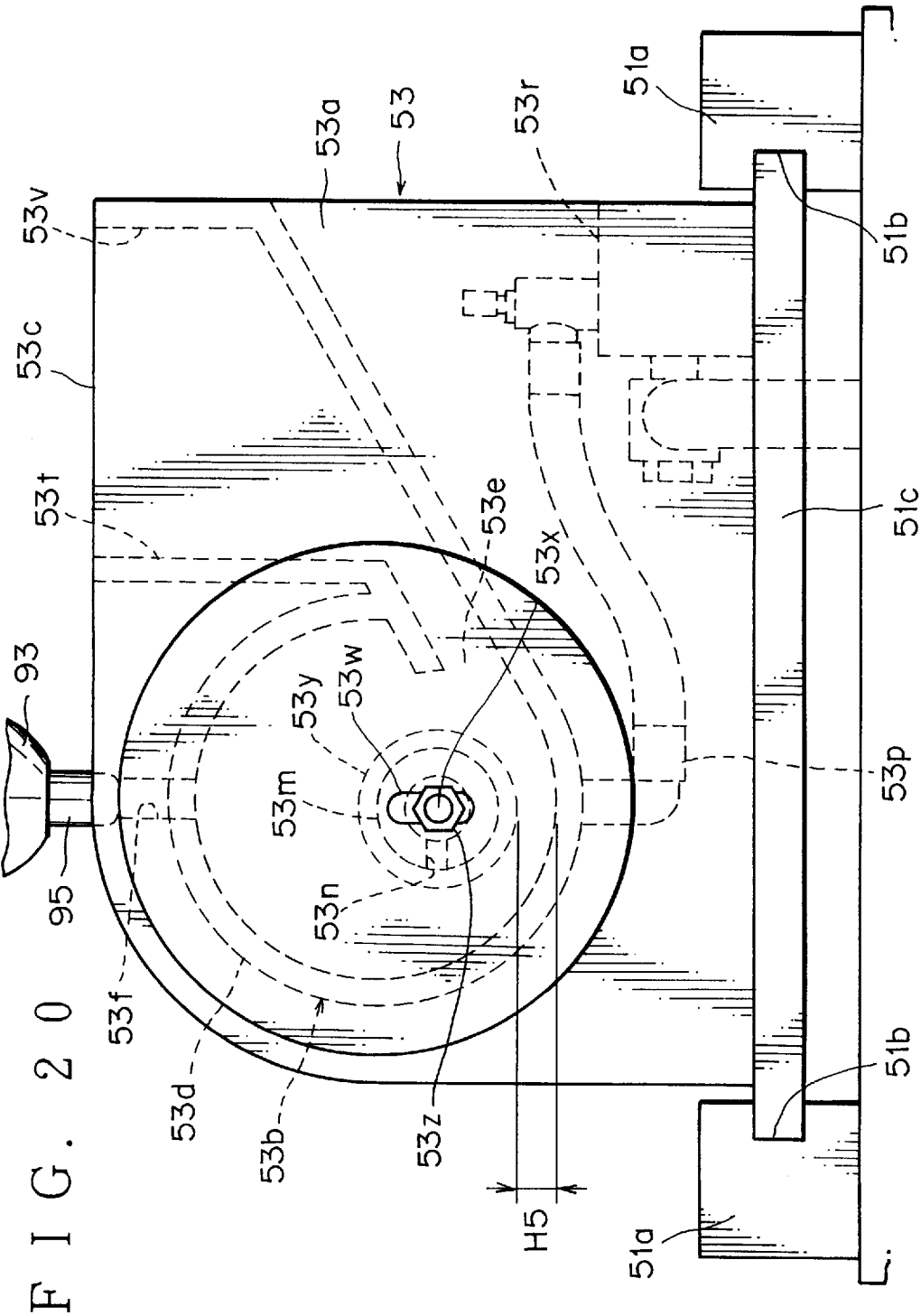
FIG. 20 is an enlarged schematic lateral view of an air chamber obtained by modifying that of the tank main body of FIG. 7.

However, as seen from the enlarged lateral view of FIG. 20, it may be so arranged that the gap H5 between the inner peripheral surface of the bottom of the tank main body 53b and the air chamber 53 (that corresponds to the gap between the air chamber 53m and the lower end of the inside of the tank main body 53b) is regulatable so that not only the quantity of seeds agitated in the tank main body 53b, but also the quantity of seeds fed into the tank main body 53b from the hopper section 53c of the seed feeding section 5 may be regulated principally by the gap H5.

In such an arrangement, the seed tank 53 may be provided with an vertically oblong hole 53w at each of the lateral walls 53a of the seed tank 53 and a blind panel 53y, having a diameter greater than the diameter of the air chamber 53m arranged in the tank main body 53b and extending between the lateral walls 53a, is fitted to the lateral ends of the air chamber 53m.

Then, the bolt 53x projecting outward from the center of the blind panel 53y is made to pass through the oblong holes 53w and nuts 53z are screwed onto the opposite ends of the bolt 53x projecting through the lateral walls 53a so that the height of the gap H5 of the air chamber 53m may be regulated by moving the vertical position of the bolt 53x along the oblong holes 53w.

It should be noted that the blind panel 53y is sufficiently large in diameter to cover the entire oblong holes 53w regardless of the vertical position of the bolt 53x in the oblong holes 3w.

While the guide paddles 113b of the gel-guide mechanism 113 for guiding gel-coated seeds in the hardening agent of the gel-hardening tank 111 are standing vertically at regular intervals from the surface of belt 113f of the belt conveyor 113a in the above embodiment, they may not necessarily be standing from the belt conveyor 113a.

Figure 21:
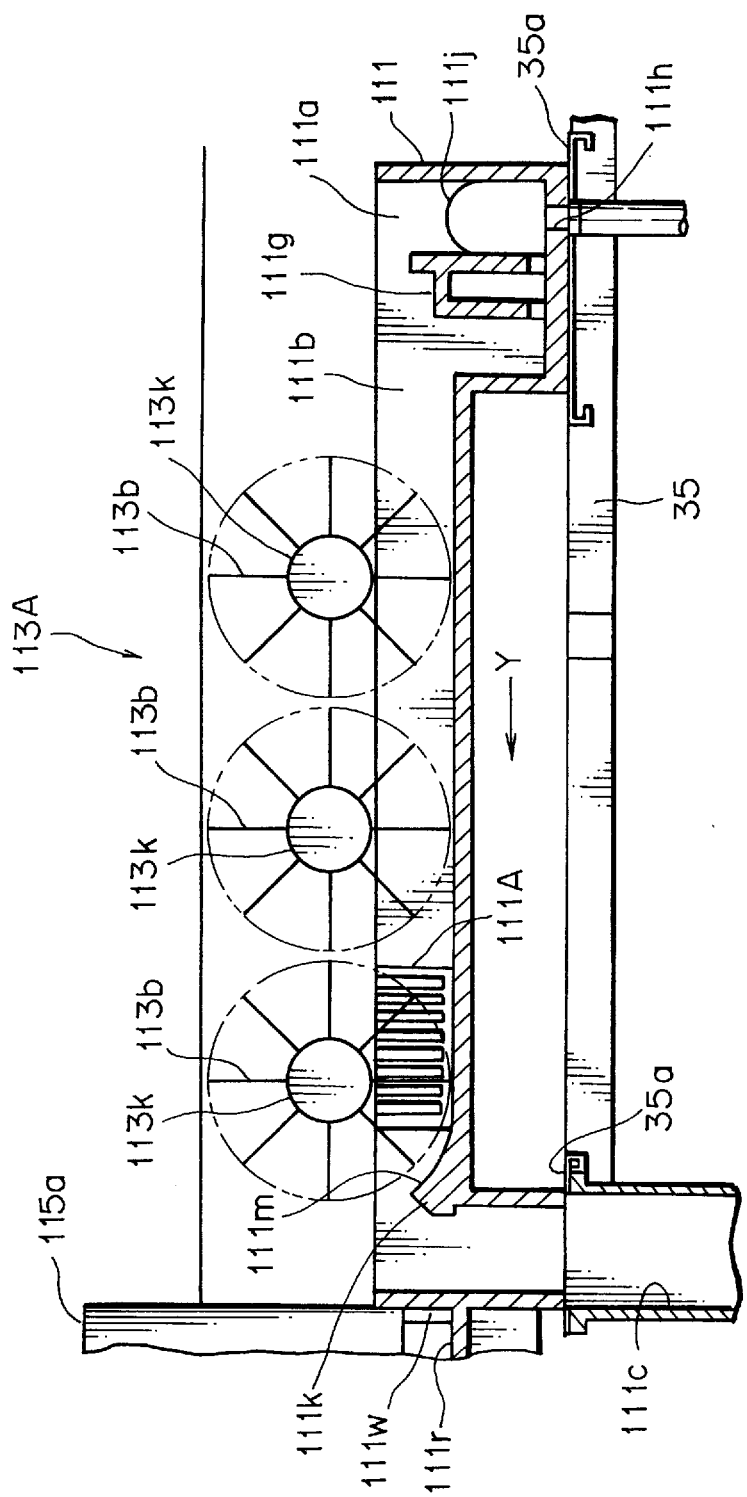
FIG. 21 is an enlarged schematic lateral view of a gel guide mechanism obtained by modifying that of the gel-hardening section of FIG. 16.
Figure 22:
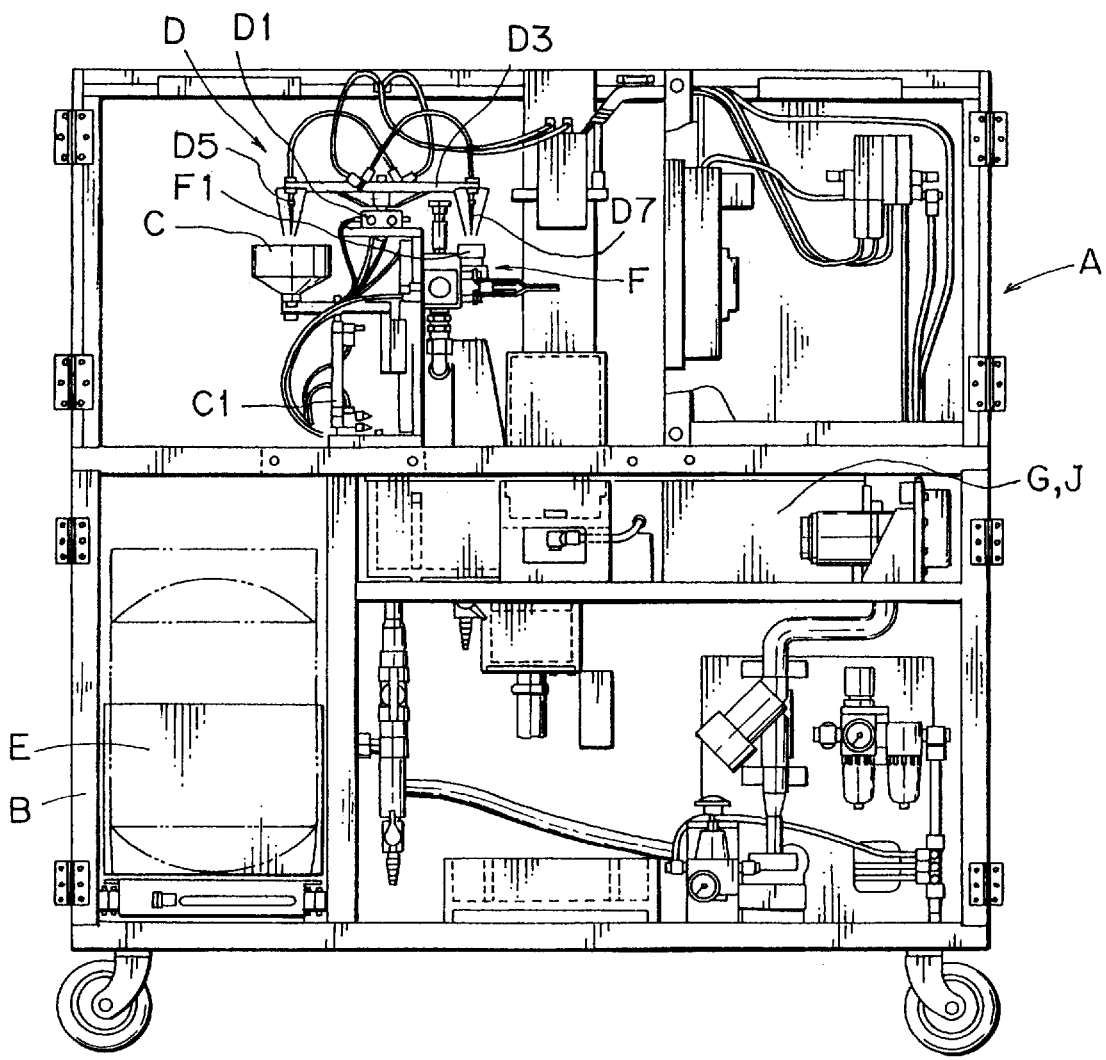
FIG. 22 is a schematic front view of a known gel-coating apparatus.
Figure 23:
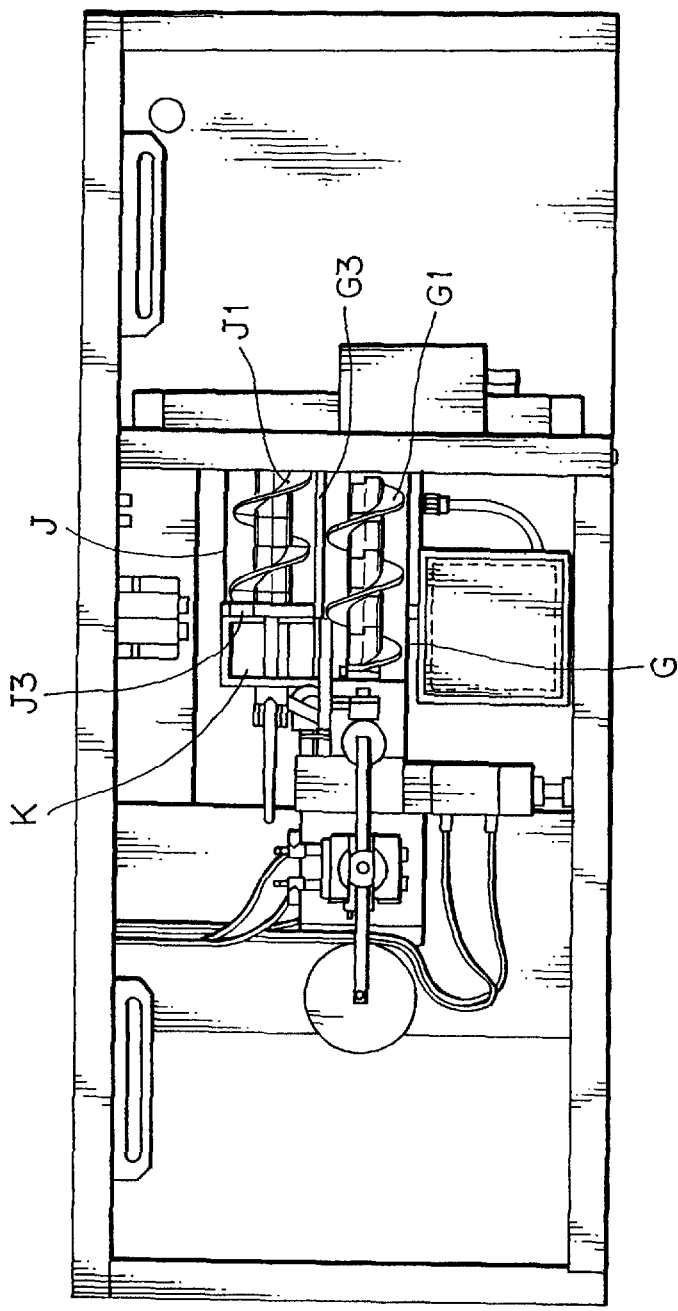
FIG. 23 is a schematic plan view of the known gel-coating apparatus of FIG. 22.

For example, as shown in the enlarged lateral section view of FIG. 21, a gel-guide mechanism 113A may alternatively be formed by arranging a plurality of rollers 113k having a width corresponding to that of the gel-hardening tank 111 longitudinally at intervals above the reaction tank section 111b of the gel-hardening tank 111 and then arranging a plurality of guide paddles 113b to radially project from the periphery of each of the rollers 113.

In this arrangement, the gel-coated seeds in the hardening agent of the gel-hardening tank 111 are guided into or out of the hardening agent by driving the rollers 113k to rotate and causing the guide paddles 113b of the rollers 113k to drive the seeds from the liquid supply tank section 111a toward the liquid blocking barrage 111k.

While the above embodiment includes a seed feeding section 5 and a gel-washing section 13, either one or both of them may be omitted without functionally damaging the effect of a gel-coating apparatus 1 according to the present invention.

While a total of eight gel-coated seeds are arranged transversely and simultaneously treated in the hardening agent in the gel-hardening section 11 of the above embodiment, a screw feeder as that of the gel-washing section 13 may alternatively be arranged in the gel-hardening section 11 so that eight gel-coated seeds may be sequentially processed for hardening.

Finally, while eight seeds are processed simultaneously in the seed transfer section 9, the gel-coating section 7 and the gel-hardening section 11 of the above embodiment, the number of seeds to be treated simultaneously may be other than eight, or may be less than or more than eight.

According to the first aspect of the present invention, a seed feeding tank of a gel-coating apparatus is provided which includes a tank main body for containing a large number of seeds to be coated with polymeric gel and a seed discharge port for keeping the inside of the tank main body in communication with the outside, the seed discharge port being disposed vis-a-vis a suction tip located outside the tank main body for sucking a seed from the tank main body, holding the seed and moving the seed to the outside of the tank main body. The seeds in the tank main body are agitated by an air jet flow, wherein the seed discharge port has a large diameter section arranged at the seed discharge port on the outside of the tank main body with an inner diameter corresponding to the outer profile of the suction tip to receive the suction tip located vis-a-vis the seed discharge port in the outside of the tank main body and a small diameter section arranged at the seed discharge port on the inside of the tank main body with an inner diameter smaller than that of the larger diameter section but large enough to allow a seed to pass therethrough. The large diameter section and the small diameter section are held in communication with each other.

In a seed feeding tank of a gel-coating apparatus as described above, the inside and the outside of the tank main body are held in communication with each other by a small air through path that is produced at the seed discharge port arranged around the suction tip as the front end of the suction tip is inserted until it comes close to the boundary of the large diameter section and the small diameter section of the seed discharge port so that the air jet flow for agitating the seeds contained in the tank main body for processing partly leaks out of the tank main body by way of the air flow path. Thus, the seeds in the inside of the tank main body can easily come close to the seed discharge port as they are driven by the air jet flow partly leaking out of the tank main body so that all the agitated seeds in the tank main body can be surely and securely sucked by the suction tip regardless of the quantity of the seeds contained in the tank main body.

If a seed feeding tank of a gel-coating apparatus as defined above is so designed that its tank main body has through bores, each having an inner diameter greater than that of the seed discharge port, and the seed discharge port is arranged at an inner peripheral section of an annular adapter removably fitted to each of the through bores, a cumbersome operation of forming a seed discharge port with a complex profile of having a large diameter section and a small diameter section directly in the tank main body can be avoided.

A seed feeding tank of a gel-coating apparatus as defined above may additionally be provided with a plurality of suction tips having different profiles, such that one suction tip having a profile fitting most the profile of each of the seeds to be processed is selected for use, and also with a plurality of adapters having respective seed discharge ports with different inner diameters corresponding to the respective profiles of the plurality of suction tips, so that one having an inner diameter fitting most to the profile of each of the seeds to be processed is selected for use.

Then, the inner diameter of the seed discharge port can easily be adapted to the profile of the suction tip in position simply by selecting one of the prefabricated adapters that best fits the suction tip each time the suction tip is replaced.

A seed feeding tank of a gel-coating apparatus as defined above may further include an air chamber arranged at a lower area in the inside of the tank main body which is designed to inject an air jet flow of compressed air fed from the outside to the inside of the tank main body to agitate the seeds to be processed. The rate of agitation by the air jet flow of the seeds to be processed in the tank main body is defined by the gap between the air chamber and the lower end of the inside of the tank main body.

According to the second aspect at the present invention, there is provided a seed feeding tank of a gel-coating apparatus including a tank main body for containing a large number of seeds to be coated with polymeric gel. The seeds in the tank main body are agitated in the tank main body by an air jet flow. An air chamber is arranged at a lower area in the inside of the tank main body and is designed to inject an air jet flow of compressed air fed from the outside to the inside of the tank main body to agitate the seeds to be processed. The rate of agitation by the air jet flow of the seeds to be processed in the tank main body is defined by the gap between the air chamber and the lower end of the inside of the tank main body.

Thus, the rate of agitation by the air jet flow of the seeds to be processed in the tank main body is defined by the gap between the air chamber and the lower end of the inside of the tank main body and the rate of agitation by an air jet flow of the seeds contained in the tank main body for processing is held to a substantially constant level regardless of the quantity of the seeds contained in the tank main body.

A seed feeding tank of a gel-coating apparatus as defined above may be so designed that its tank main body has an arcuate inner peripheral surface to form an arcuate agitating air jet flow along the inner peripheral surface out of the compressed air injected from the air chamber.

Thus, the seeds contained in the tank main body are agitated by an air jet flow in a substantially constant direction regardless of the quantity of the seeds contained in the tank main body.

A seed feeding tank of a gel-coating apparatus as defined above may additionally be so designed that the air chamber is vertically movably supported by the tank main body.

Thus, the seeds contained in the tank main body are agitated by an air jet flow in a substantially constant direction regardless of the quantity of the seeds contained in the tank main body.

According to the third aspect of the invention, a seed feeding tank of a gel-coating apparatus is provided as defined above and additionally so designed that the tank main body is provided with a hopper section receiving seeds to be contained in the tank main body for processing and a slit for keeping the inside of the hopper in communication with the inside of the tank main body. The rate of supplying seeds to be processed from the inside of the hopper to the inside of the tank main body is defined by the dimensions of the slit.

Thus, since the rate of supplying seeds to be processed from the inside of the hopper to the inside of the tank main body is defined by the dimensions of the slit, seeds are automatically supplied to the inside of the tank main body whenever the quantity of the seeds in the tank main body falls under a predetermined level as the seeds are gradually moved to the downstream step of coating them with a gellant.

What is claimed is:

1. A seed supplying device for a gel coating apparatus, wherein said seed supplying device includes a feed tank with an air chamber and a suction device, said seed supplying device comprising:

a tank main body for containing a plurality of seeds to be coated with polymeric gel; and a seed discharge port for keeping an inside of said tank main body in communication with an outside of said tank main body, said seed discharge port being disposed adjacent to a suction tip located on said outside of said tank main body for sucking a seed from said tank main body, holding said seed and moving said seed to said outside of said tank main body, said seeds in said tank main body being agitated by an air jet flow, wherein said seed discharge port comprises:

a large diameter section arranged at said seed discharge port on said outside of said tank main body with an inner diameter corresponding to said outer profile of said suction tip to receive said suction tip located adjacent to said seed discharge port in said outside of said tank main body; and a small diameter section arranged at said seed discharge port on said inside of said tank main body with an inner diameter smaller than said inner diameter of said larger diameter section, but large enough to allow a seed to pass therethrough, said large diameter section and said small diameter section being held in communication with each other.

2. The seed supplying device of claim 1, wherein said tank main body has through bores, each having an inner diameter greater than said inner diameter of said seed discharge port, said seed discharge port being arranged at an inner peripheral section of an annular adaptor removably fitted to each said through bores.

3. The seed supplying device of claim 2, further comprising a plurality of suction tips having different profiles, wherein one suction tip of said plurality of suction tips, which has a profile fitting most to said profile of each of said seeds to be processed, is selected for use, and also with a plurality of adapters having respective profiles of said plurality of suction tips, of which one having an inner diameter fitting most to said profile of each of said seeds to be processed is selected for use.

4. The seed supplying device of claim 1, further comprising an air chamber arranged at a lower area in said inside of said tank main body and designed to inject an air jet flow of compressed air fed from said outside to said inside of said tank main body to agitate said seeds to be processed, a rate of agitation by said air jet flow of said seeds to be processed in said tank main body being defined by said gap between said air chamber and said lower end of said inside of said tank main body.

5. The seed supplying device of claim 2, further comprising an air chamber arranged at a lower area in said inside of said tank main body and designed to inject an air jet flow of compressed air fed from said outside to said inside of said tank main body to agitate said seeds to be processed, a rate of agitation by said air jet flow of said seeds to be processed in said tank main body being defined by said gap between said air chamber and said lower end of said inside of said tank main body.

6. The seed supplying device of claim 3, further comprising an air chamber arranged at a lower area in said inside of said tank main body and designed to inject an air jet flow of compressed air fed from said outside to said inside of said tank main body to agitate said seeds to be processed, a rate of agitation by said air jet flow of said seeds to be processed in said tank main body being defined by said gap between said air chamber and said lower end of said inside of said tank main body.

7. A seed supplying device for a gel coating apparatus, wherein said seed supplying device includes a feed tank with an air chamber and a suction device, said seed supplying device comprising:

a tank main body for containing a plurality of seeds to be coated with polymeric gel, said seeds in said tank main body being agitated in said tank main body by an air jet flow; and an air chamber arranged at a lower area in an inside of said tank main body to inject an air jet flow of compressed air fed from an outside to said inside of said tank main body to agitate said seeds to be processed, a rate of agitation by said air jet flow of said seeds to be processed in said tank main body being defined by a gap between said air chamber and a lower end of said inside of said tank main body.

8. The seed supplying device of claim 4, wherein said tank main body has an arcuate inner peripheral surface to form an arcuate agitating air jet flow along said inner peripheral surface out of said compressed air injected from said air chamber.

9. The seed supplying device of claim 7, wherein said tank main body has an arcuate inner peripheral surface to form an arcuate agitating air jet flow along said inner peripheral surface out of said compressed air injected from said air chamber.

10. The seed supplying device of claim 4, wherein said air chamber arranged at a lower area inside of said tank main body is secured at a suitable position in a vertical direction in order to adjust said rate of agitation.

11. The seed supplying device of claim 7, wherein said air chamber arranged at a lower area inside of said tank main body is secured at a suitable position in a vertical direction in order to adjust said rate of agitation.

12. The seed supplying device of claim 8, wherein said air chamber arranged at a lower area inside of said tank main body is secured at a suitable position in a vertical direction in order to adjust said rate of agitation.

13. The seed supplying device of claim 1, wherein said tank main body is provided with a hopper section receiving seeds to be contained in said tank main body for processing and a slit for keeping an inside of said hopper section in communication with said inside of said tank main body, a rate of supplying seeds to be processed from said inside of said hopper section to said inside of said tank main body being defined by dimensions of said slit.

14. The seed supplying device of claim 2, wherein said tank main body is provided with a hopper section receiving seeds to be contained in said tank main body for processing and a slit for keeping an inside of said hopper section in communication with said inside of said tank main body, a rate of supplying seeds to be processed from said inside of said hopper section to said inside of said tank main body being defined by dimensions of said slit.

15. The seed supplying device of claim 3, wherein said tank main body is provided with a hopper section receiving seeds to be contained in said tank main body for processing and a slit for keeping an inside of said hopper section in communication with said inside of said tank main body, a rate of supplying seeds to be processed from said inside of said hopper section to said inside of said tank main body being defined by dimensions of said slit.

16. The seed supplying device of claim 4, wherein said tank main body is provided with a hopper section receiving seeds to be contained in said tank main body for processing and a slit for keeping an inside of said hopper section in communication with said inside of said tank main body, a rate of supplying seeds to be processed from said inside of said hopper section to said inside of said tank main body being defined by dimensions of said slit.

17. The seed supplying device of claim 7, wherein said tank main body is provided with a hopper section receiving seeds to be contained in said tank main body for processing and a slit for keeping an inside of said hopper section in communication with said inside of said tank main body, a rate of supplying seeds to be processed from said inside of said hopper section to said inside of said tank main body being defined by dimensions of said slit.

18. The seed supplying device of claim 8, wherein said tank main body is provided with a hopper section receiving seeds to be contained in said tank main body for processing and a slit for keeping an inside of said hopper section in communication with said inside of said tank main body, a rate of supplying seeds to be processed from said inside of said hopper section to said inside of said tank main body being defined by dimensions of said slit.

19. The seed supplying device of claim 10, wherein said tank main body is provided with a hopper section receiving seeds to be contained in said tank main body for processing and a slit for keeping an inside of said hopper section in communication with said inside of said tank main body, a rate of supplying seeds to be processed from said inside of said hopper section to said inside of said tank main body being defined by dimensions of said slit.

* * * * *